Inventors
Charles B. De Vlieg
Howard R. De Vlieg
By Charles R. De Vlieg
The Firm of Charles W. Hills
Attys.

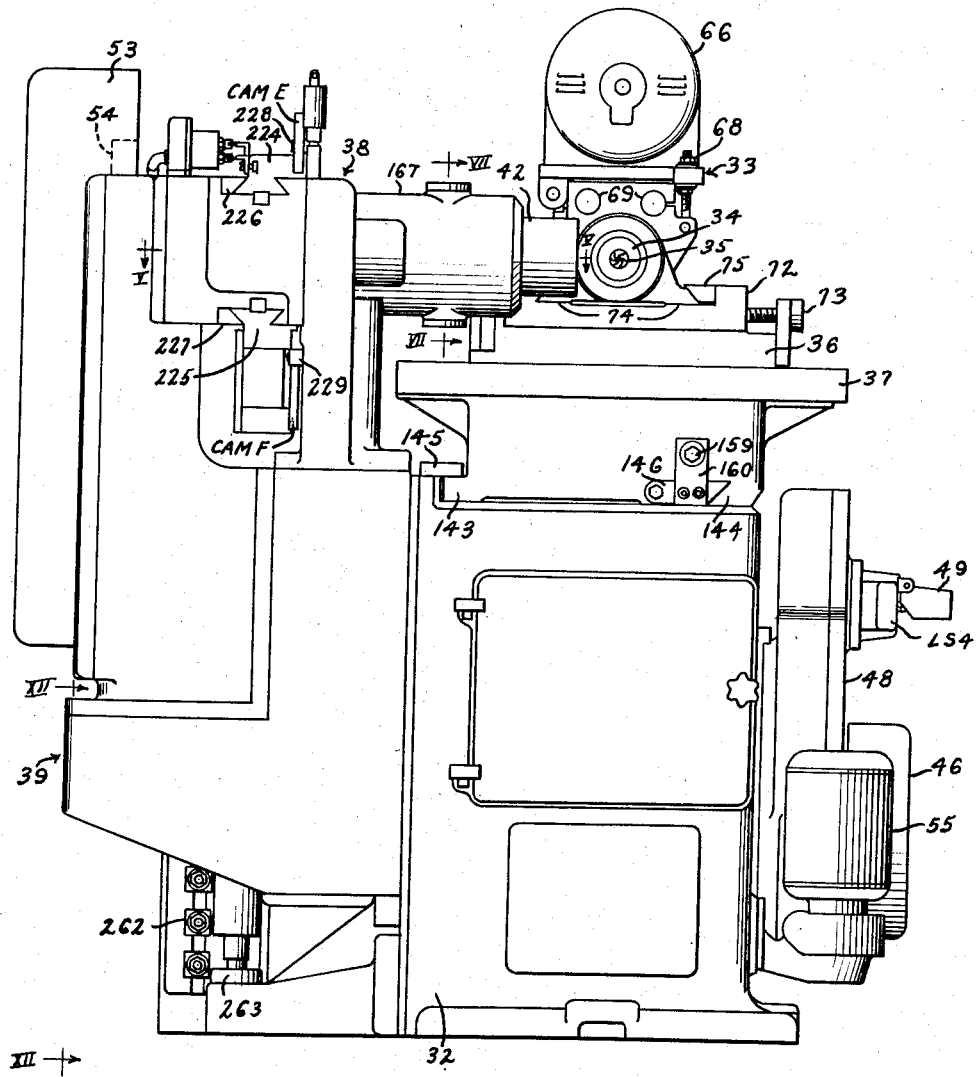

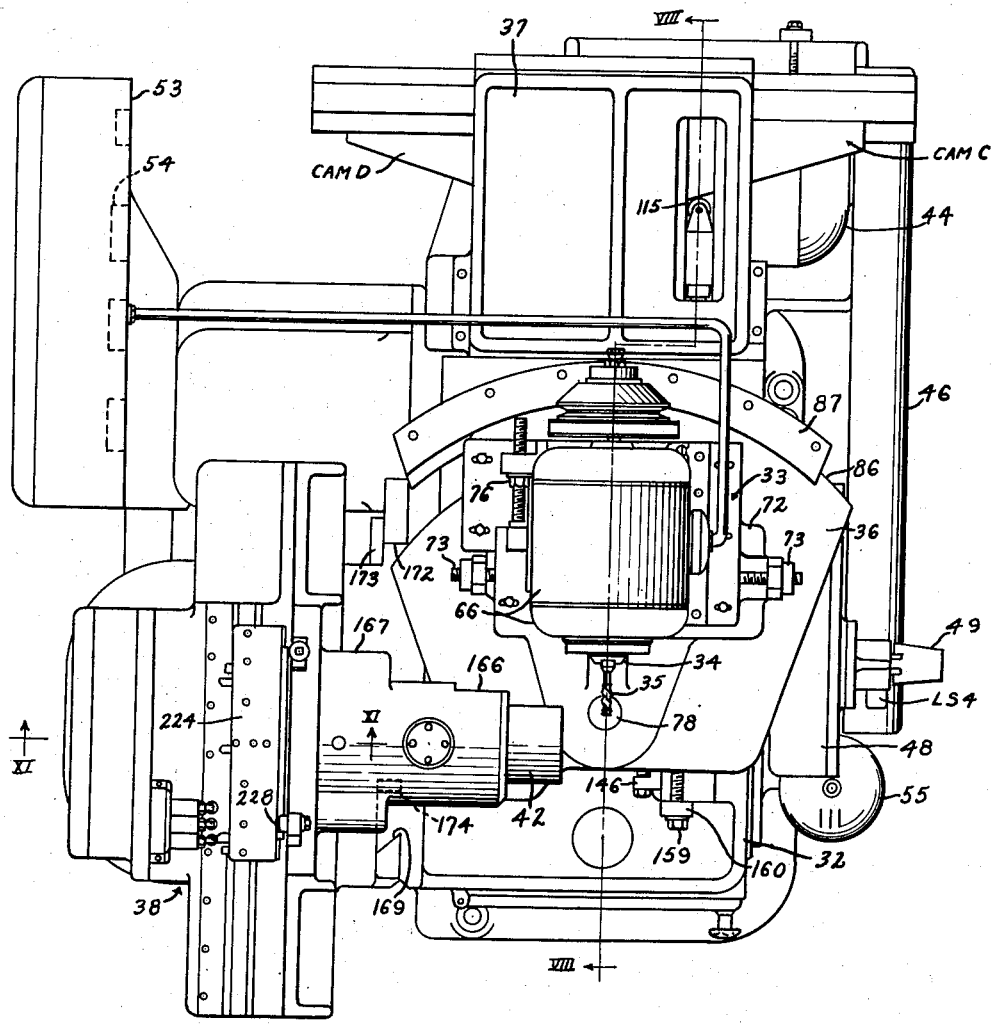

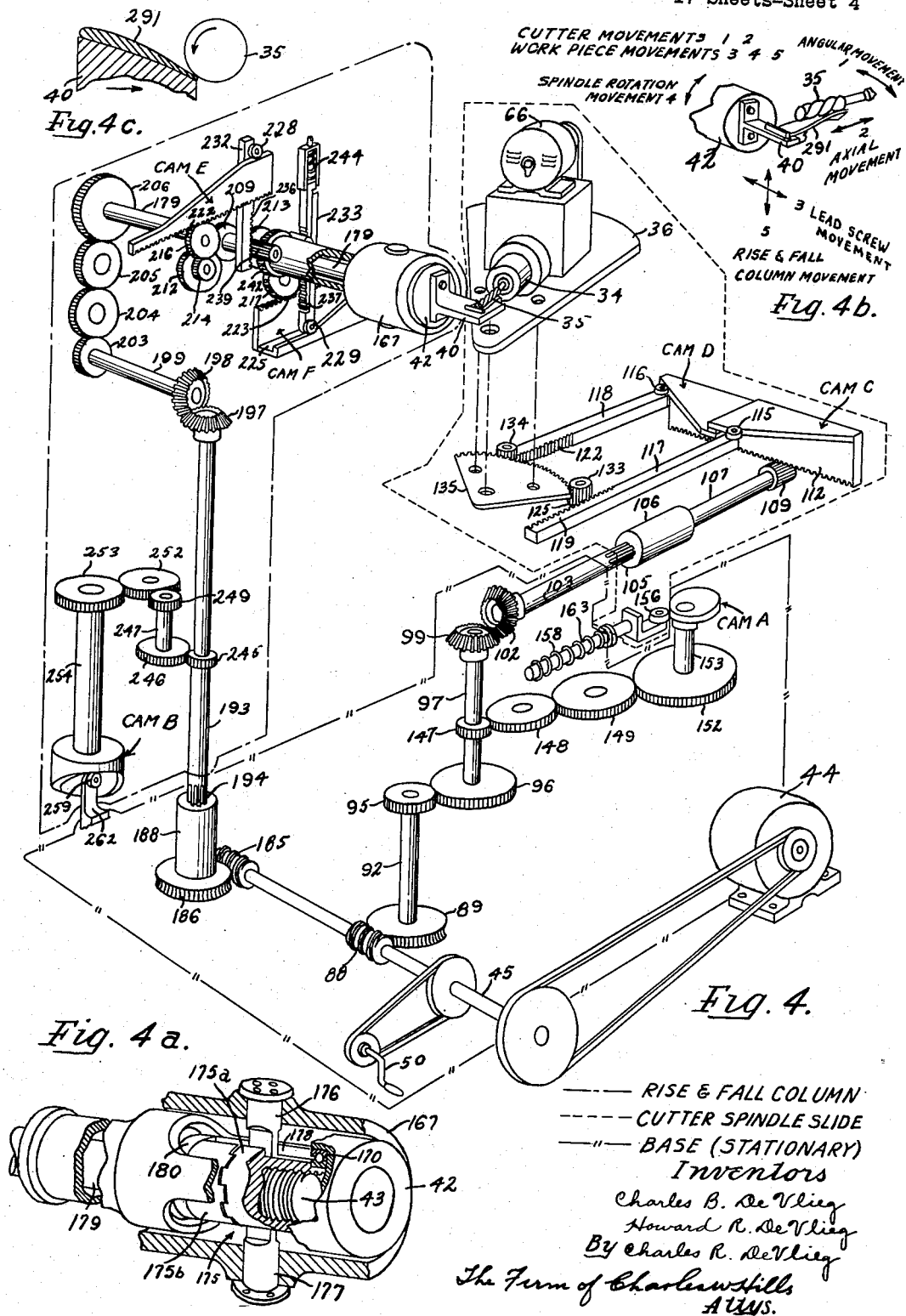

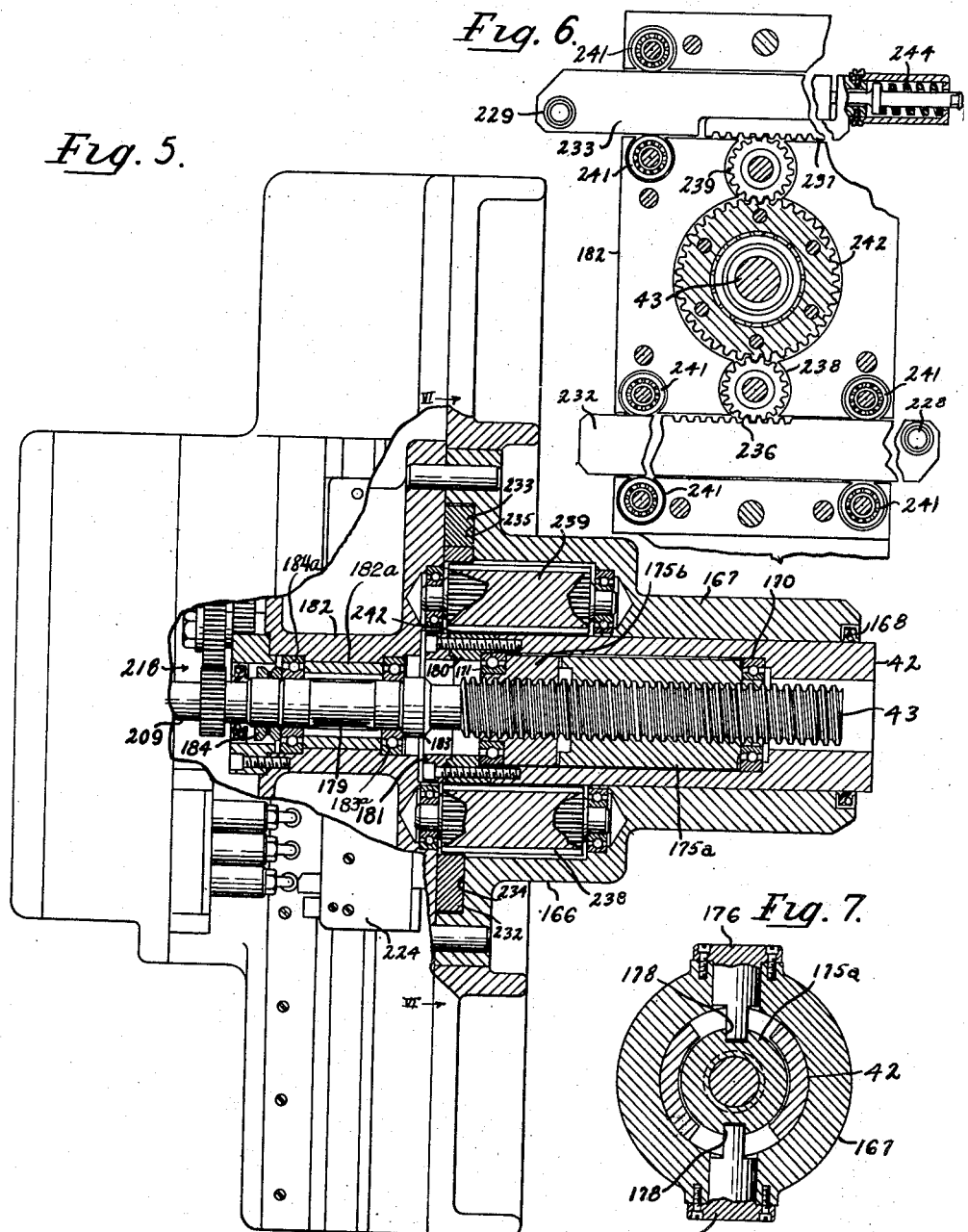

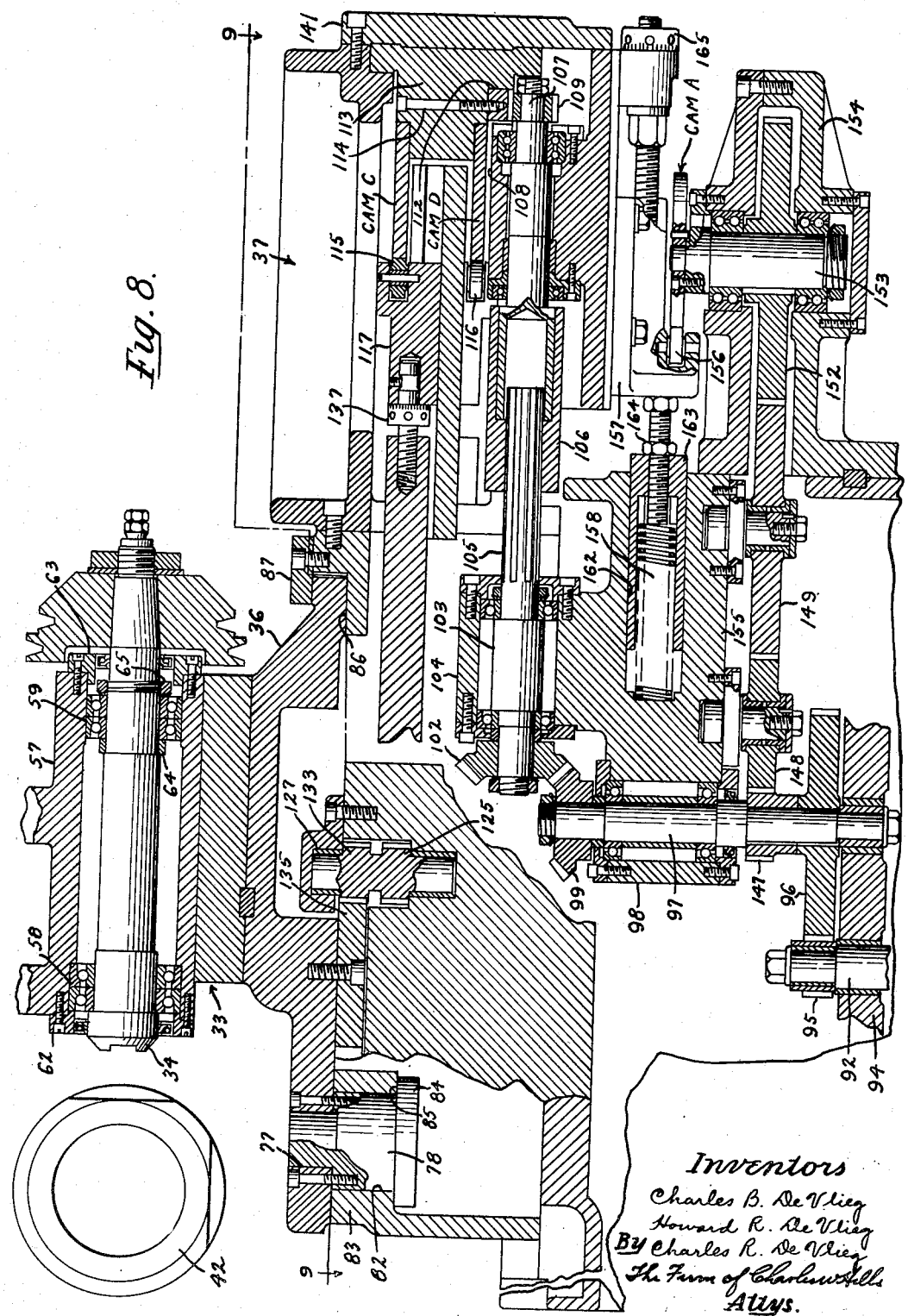

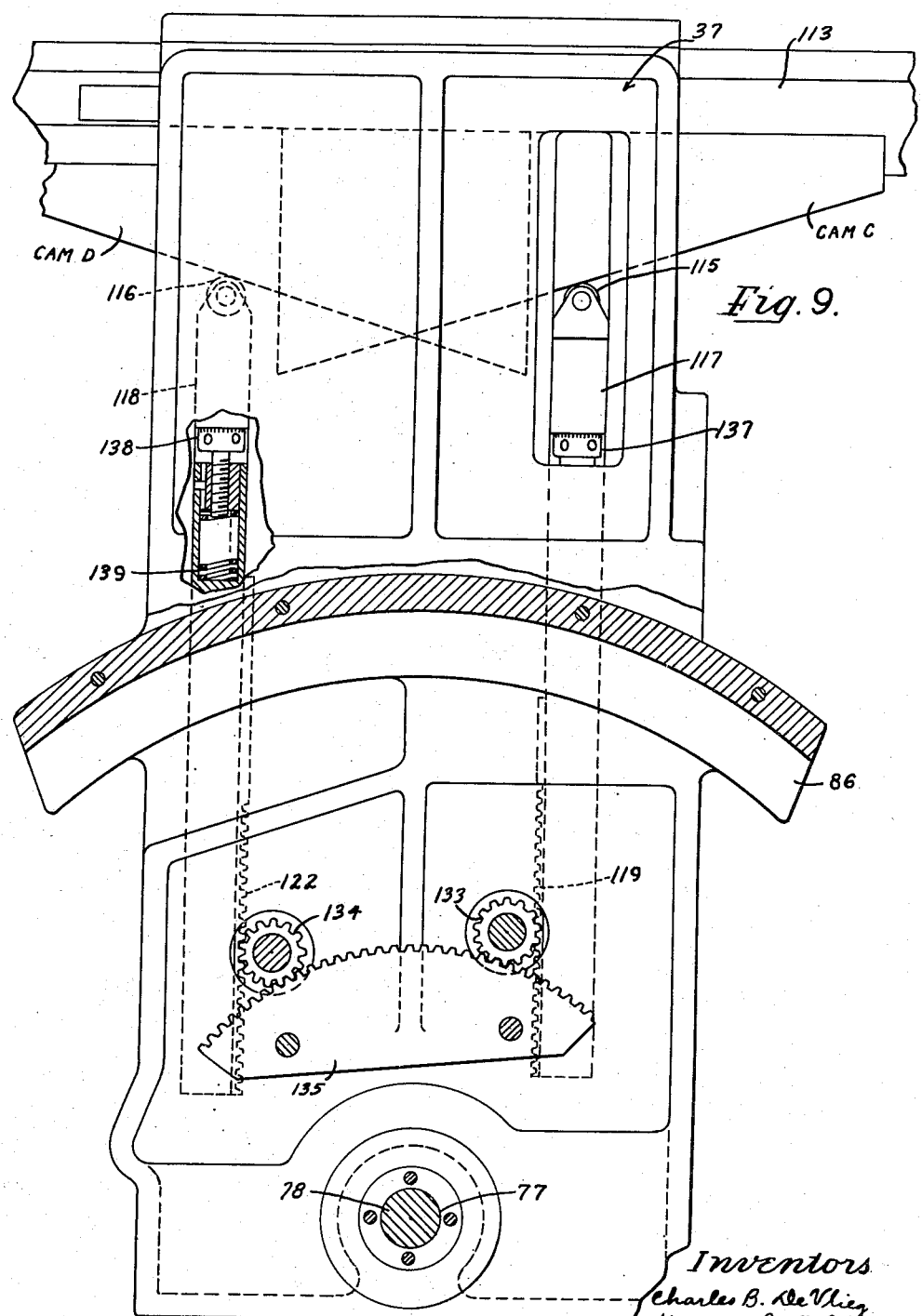

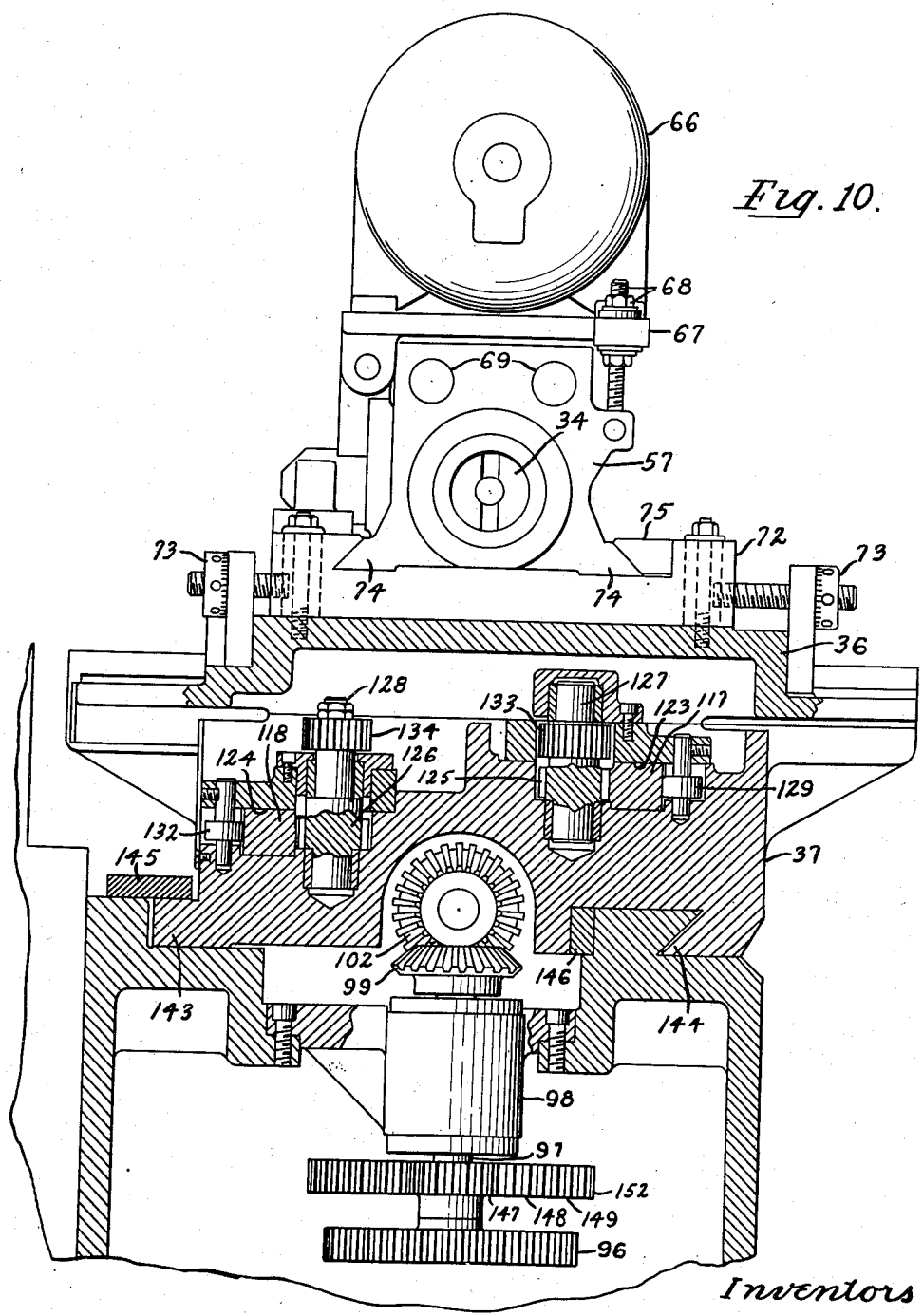

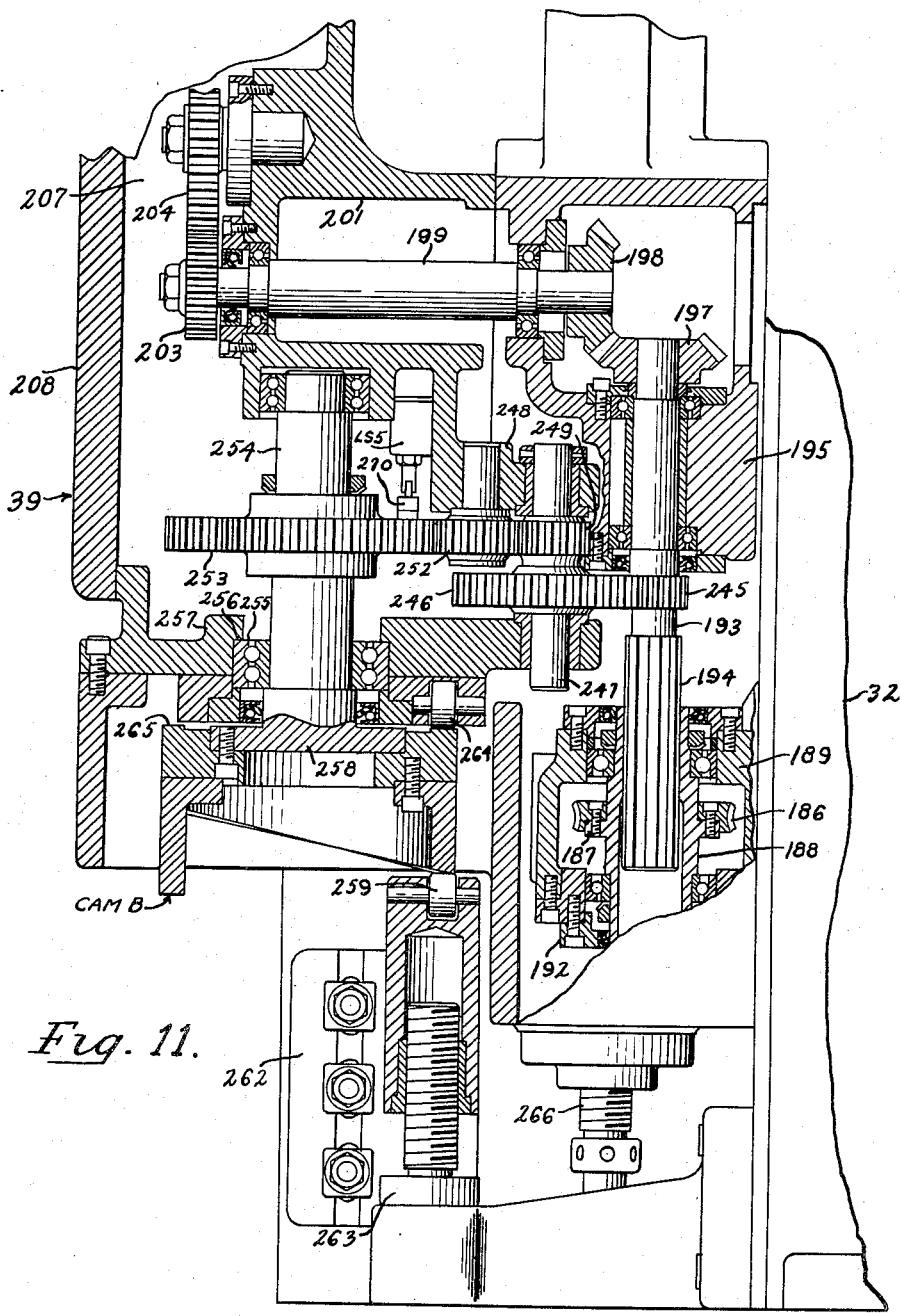

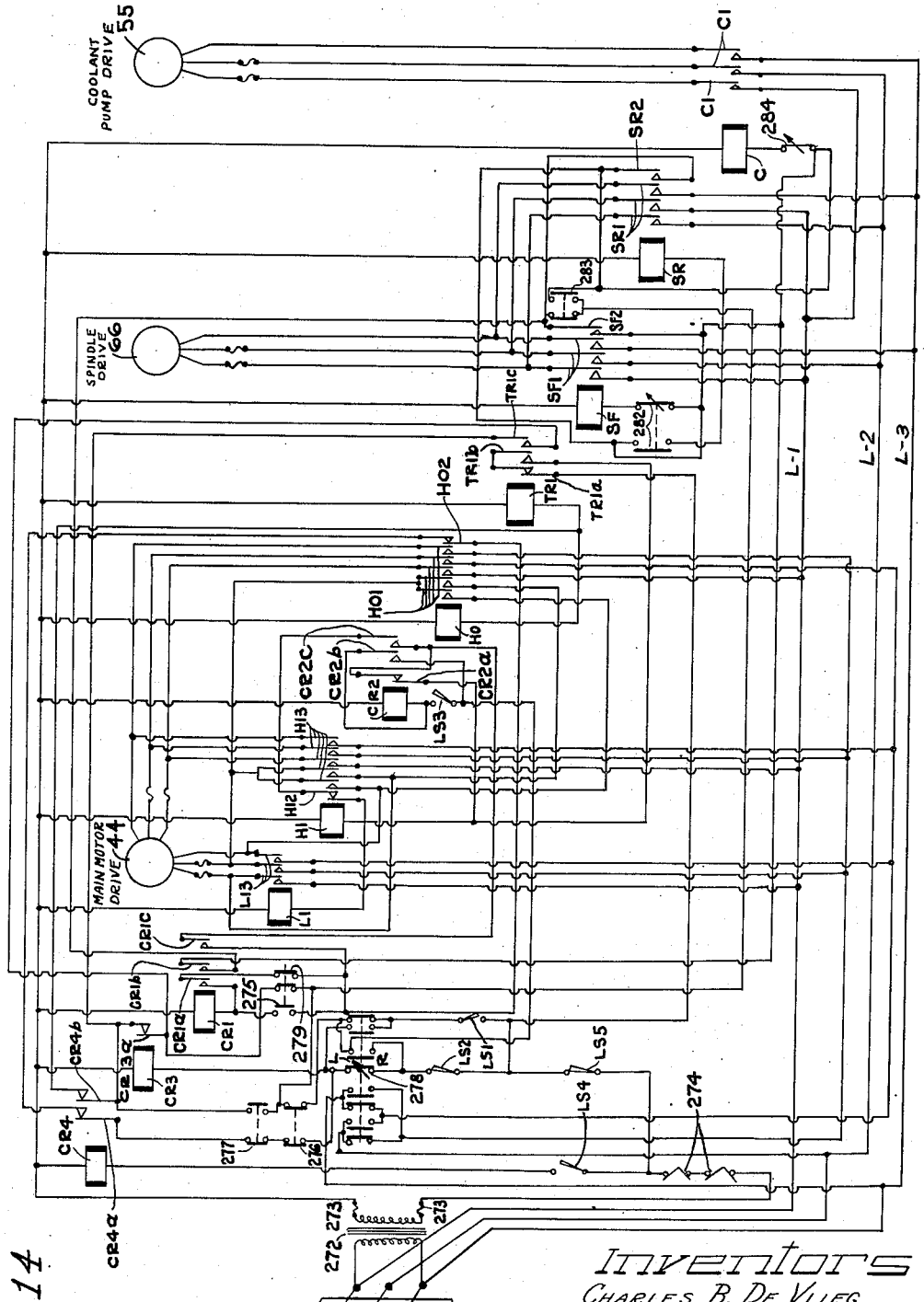

Dec. 1, 1953     C. B. DE VLIEG ET AL     2,660,930
MACHINE FOR FORMING PREDETERMINED IRREGULAR SURFACES
Filed May 15, 1947     17 Sheets-Sheet 12
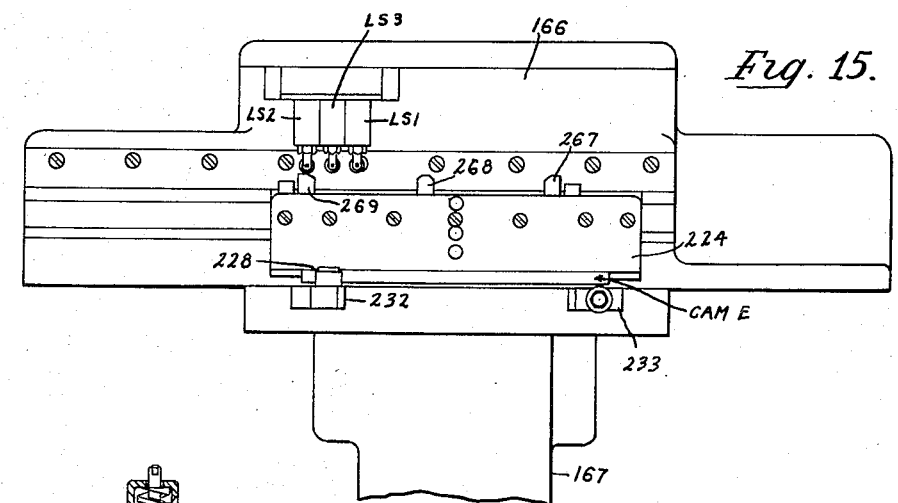
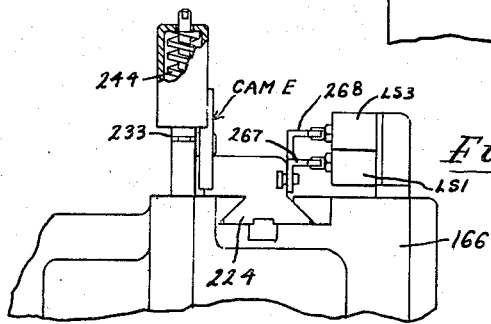

Dec. 1, 1953  C. B. DE VLIEG ET AL  2,660,930
MACHINE FOR FORMING PREDETERMINED IRREGULAR SURFACES
Filed May 15, 1947  17 Sheets-Sheet 13
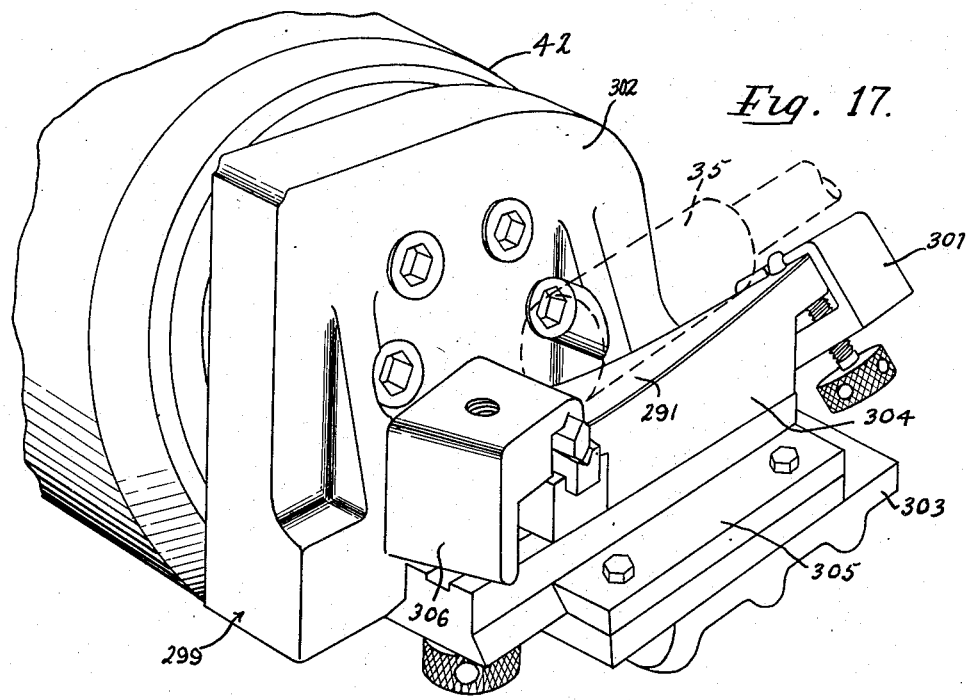
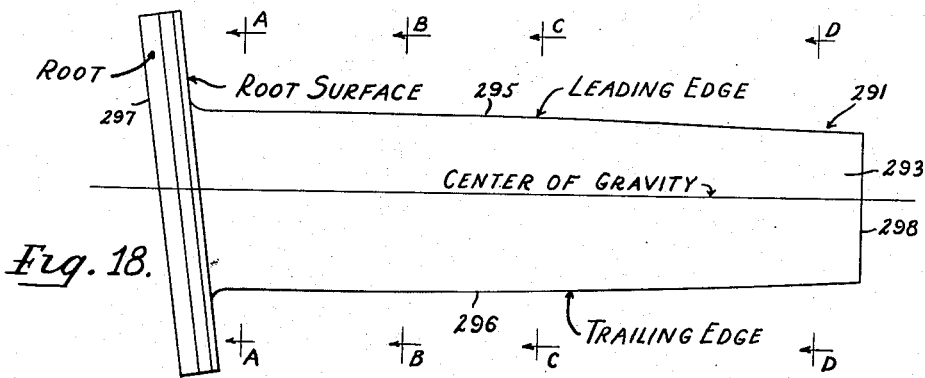
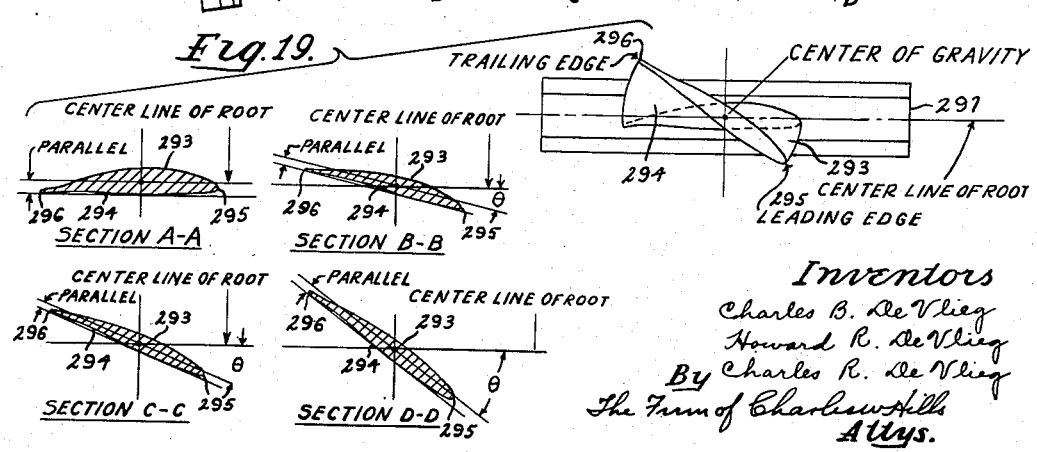
Inventors
Charles B. DeVlieg
Howard R. DeVlieg
By Charles R. DeVlieg
The Firm of Charles W. Hills
Attys.

Dec. 1, 1953      C. B. DE VLIEG ET AL      2,660,930
MACHINE FOR FORMING PREDETERMINED IRREGULAR SURFACES
Filed May 15, 1947      17 Sheets-Sheet 14
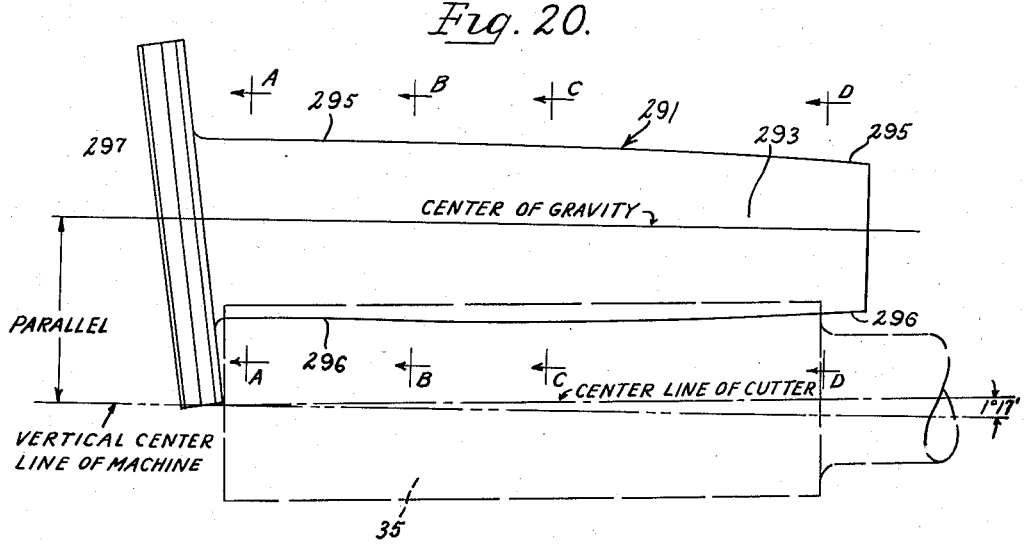
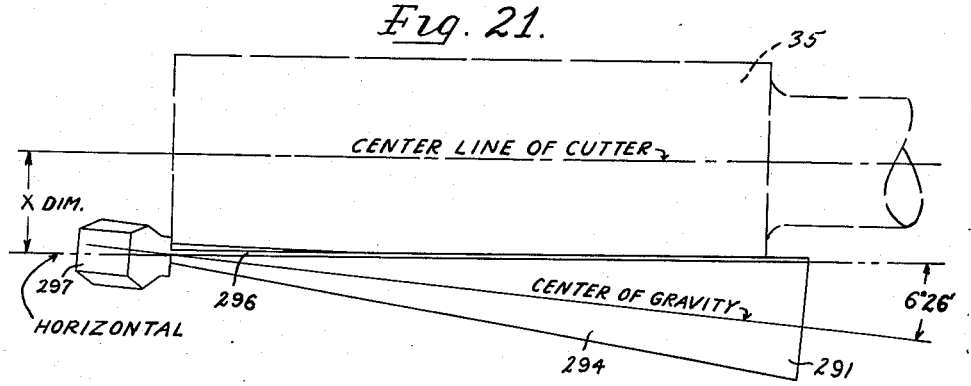
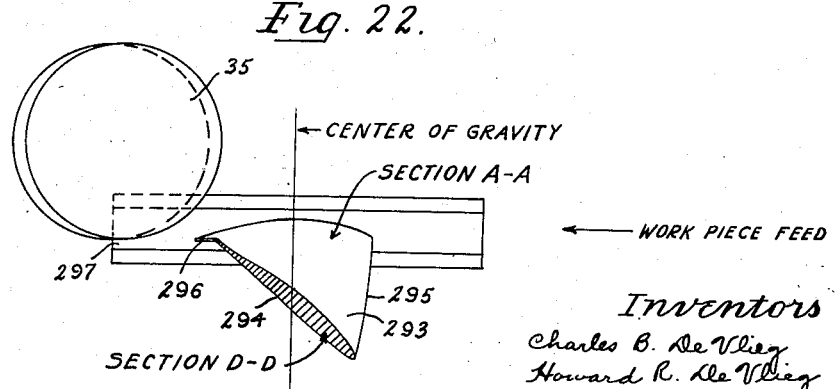

Dec. 1, 1953  C. B. DE VLIEG ET AL  2,660,930
MACHINE FOR FORMING PREDETERMINED IRREGULAR SURFACES
Filed May 15, 1947  17 Sheets-Sheet 15

Inventors
Charles B. DeVlieg
Howard R. DeVlieg
By Charles R. DeVlieg
The Firm of Charles Hill
Attys.

Dec. 1, 1953  C. B. DE VLIEG ET AL  2,660,930
MACHINE FOR FORMING PREDETERMINED IRREGULAR SURFACES
Filed May 15, 1947  17 Sheets-Sheet 16
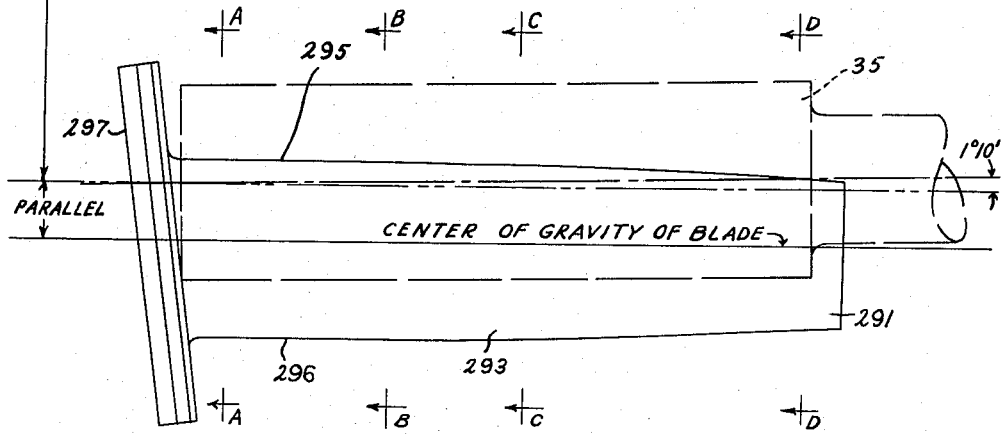
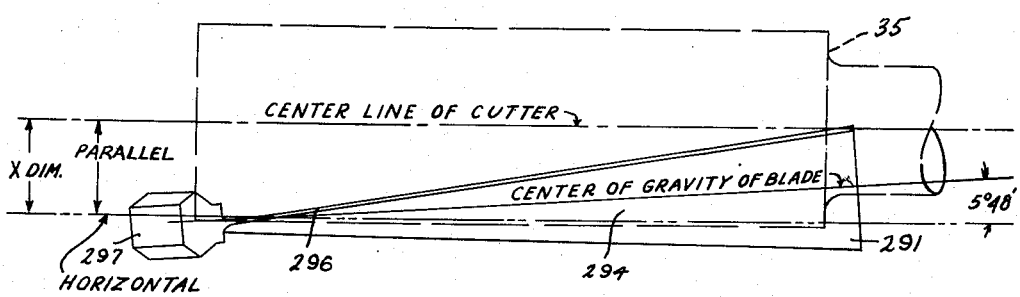
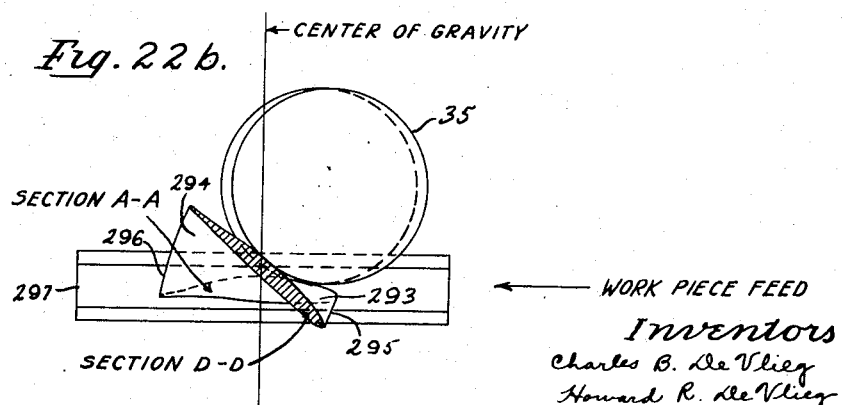

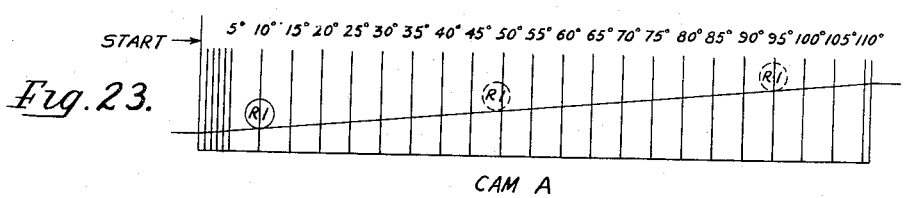
Fig. 23. CAM A
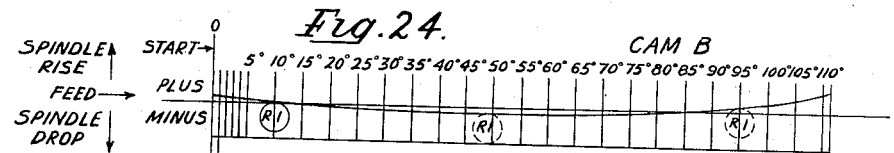
Fig. 24. CAM B
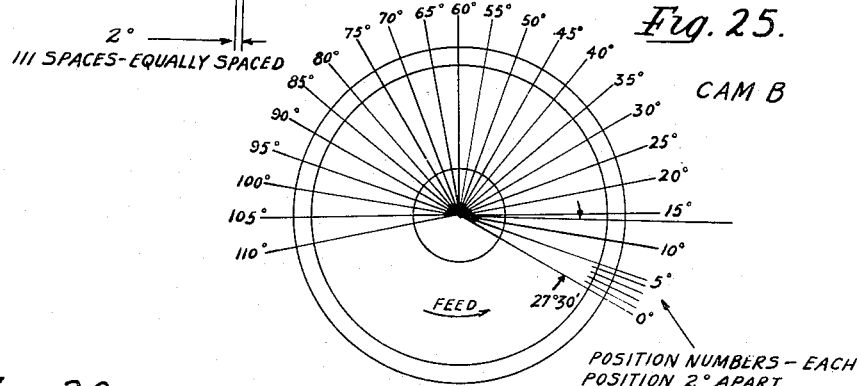
Fig. 25. CAM B
POSITION NUMBERS – EACH POSITION 2° APART
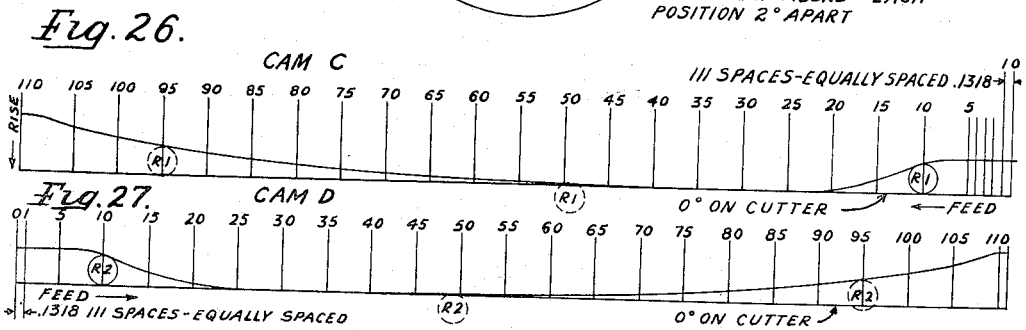
Fig. 26. CAM C
Fig. 27. CAM D
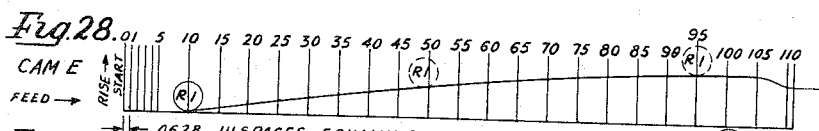
Fig. 28. CAM E
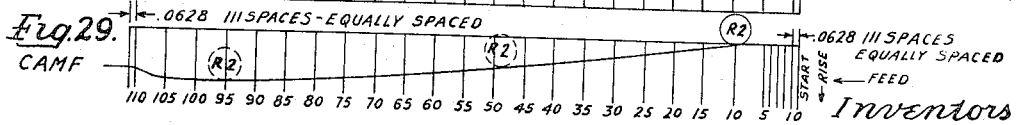
Fig. 29. CAM F
Inventors
Charles B. De Vlieg
Howard R. De Vlieg
By Charles R. De Vlieg
The Firm of Charles W. Hills
Attys.

Patented Dec. 1, 1953

2,660,930

UNITED STATES PATENT OFFICE 2,660,930

MACHINE FOR FORMING PREDETERMINED IRREGULAR SURFACES

Charles B. De Vlieg, Farmington, Howard R. De Vlieg, Grosse Pointe Woods, and Charles R. De Vlieg, Birmingham, Mich., assignors to Thompson Products, Inc., Cleveland, Ohio, a corporation of Ohio Application May 15, 1947, Serial No. 748,282

13 Claims. (Cl. 90—13)

This invention relates to a metal working machine and has more particular reference to an apparatus for and a method of machining irregular generated surfaces on articles of manufacture such as air foil surfaces on impeller blades and the like.

An object of the invention is to provide a metal working machine of the above character with means for machining an irregular generated surface on an article of manufacture in which the contour of any cross section varies from side to side or end to end respectively.

Another object of the invention is to provide a metal working machine of the above character with means by which an irregular generated surface of the foregoing description can be formed, due to the novel relationship of a cutting tool and a work piece, in a single machining operation.

Another object of the invention is to provide a machine of the above character with a plurality of coordinated relative motions in which all elements pass through cycles of forward and reverse directions of movement without backlash, whereby generated surfaces on articles of thin cross section can be positively and accurately machined.

Another object of the invention is to provide a metal working machine with means by which an irregular generated surface of the foregoing description, which must be formed within limits of precision tolerances, may be fashioned on an article of manufacture in an inexpensive manner.

Another object of the invention is the provision, in a metal working machine of the above character with means for, and in a method of forming an irregular generated surface of the foregoing characteristics of, simultaneously effecting in a predetermined coordinated manner, movement of a work piece in a direction of one of its axes toward or away from a cutter, rotative movement of the work piece about the axis in timed relation with the movement of the work piece along the axis toward or away from the cutter, movement of the work piece bodily relative to a longitudinal axis of the cutter in timed relation to the bodily movement along and the rotative movement about the axis of the work piece, movement of the cutter along its longitudinal axis relative to the work piece in timed relation with the respective movements of the work piece, and movement of the cutter angularly about the work piece in timed relation with the respective movements of the work piece and the relative movement of the cutter.

A specific object of the invention is to provide an improved method of and apparatus for machining an air foil surface on an impeller blade of the kind used in superchargers, turbines, and jet propulsion engines.

Other objects and advantages of the invention will become apparent from the following detailed description taken in connection with the accompanying drawings, in which—

Fig. 2 is an end elevation view thereof;

Fig. 3 is a top plan view thereof;

Fig. 4 is a schematic diagram in perspective showing gears and gear trains effecting motions of the respective parts of the milling machine;

Fig. 4a is an enlarged fragmentary perspective view showing details of a work holder spindle;

Fig. 4b is a diagrammatic view illustrating the movement directions of the cutter and the work piece, as performed in this machine;

Figure 1:
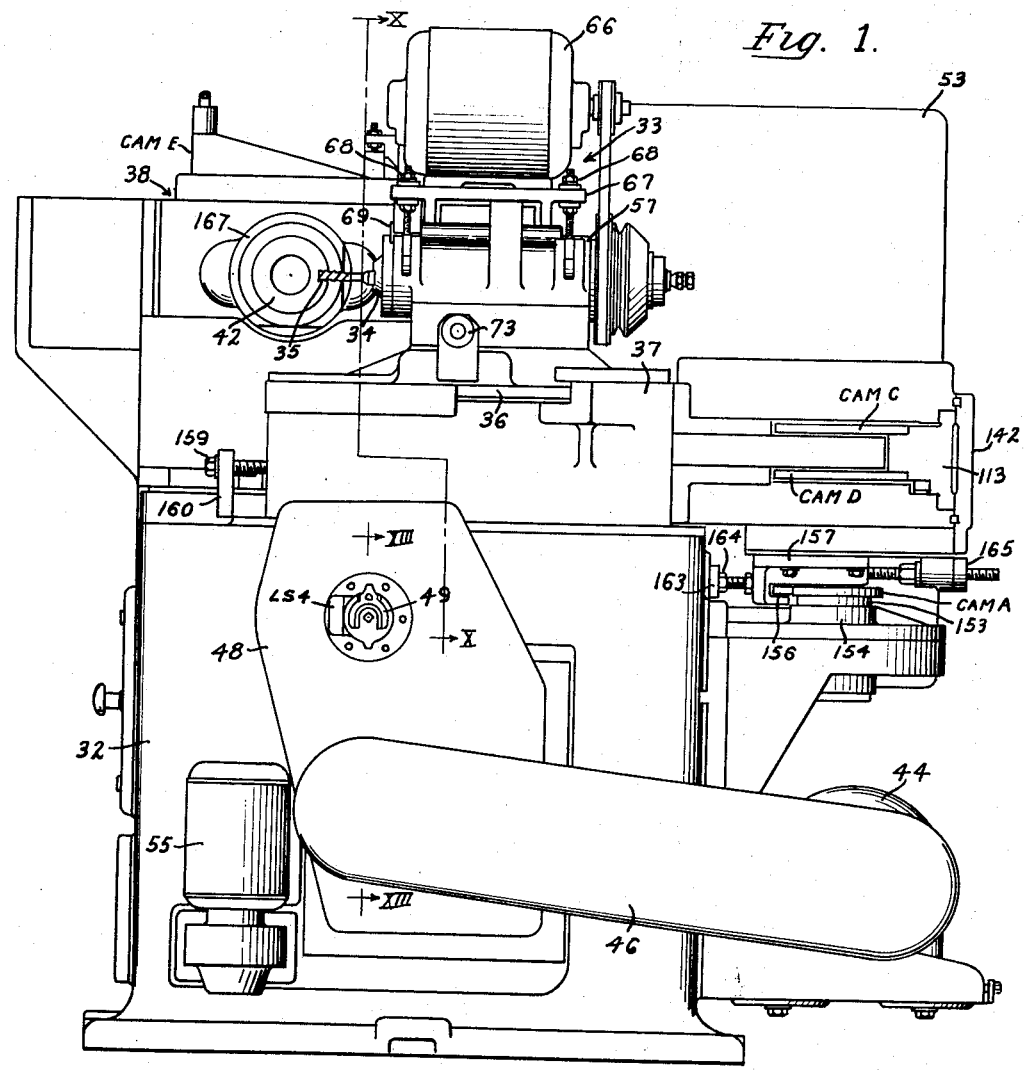
Figure 1 is a side elevation view of a milling machine embodying the present invention.
Figure 12:
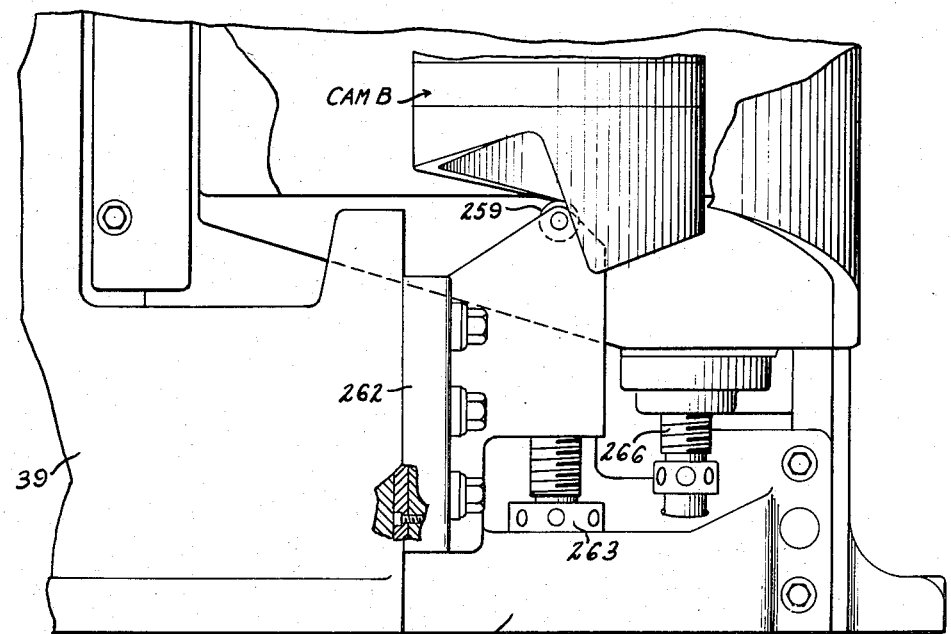
Figure 13:
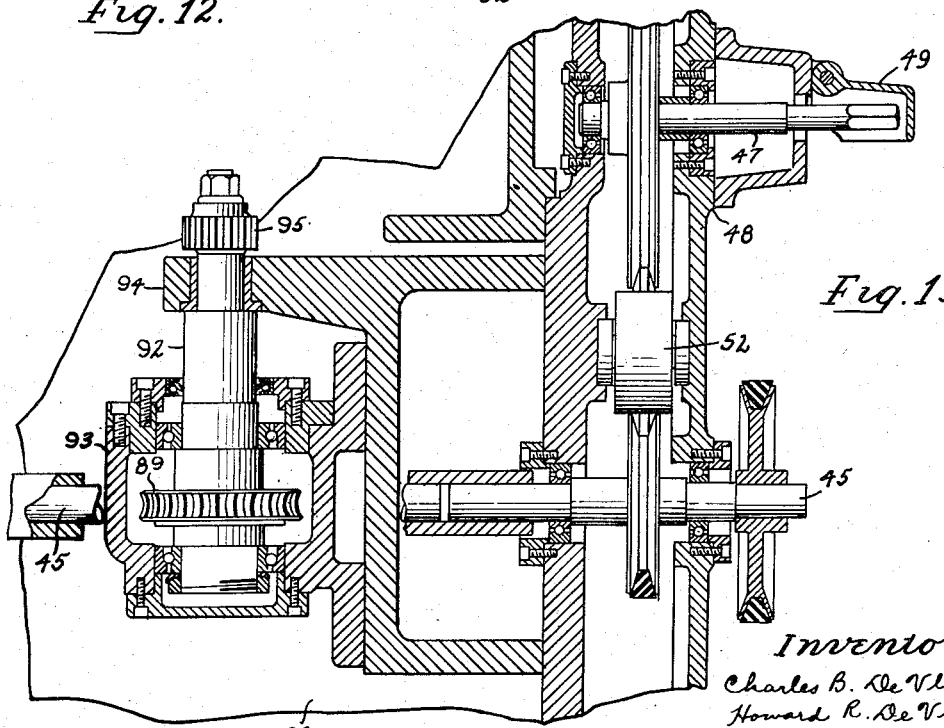
Figure 20A:
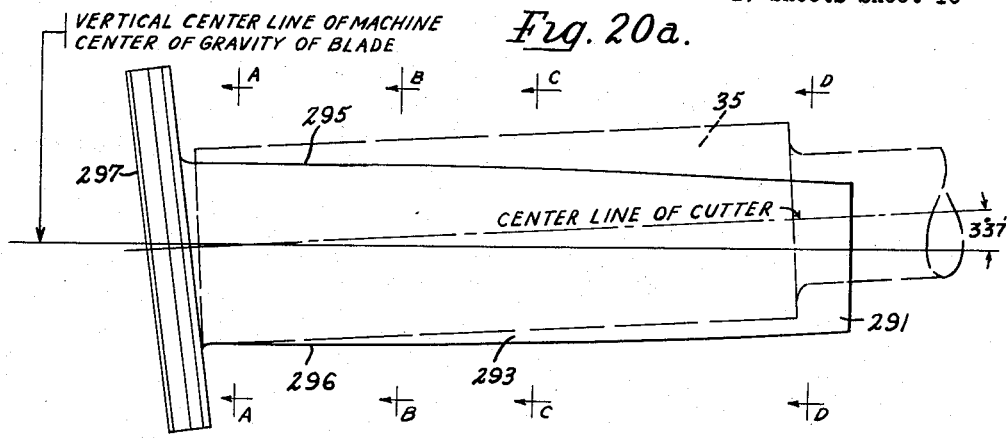
Figure 21A:
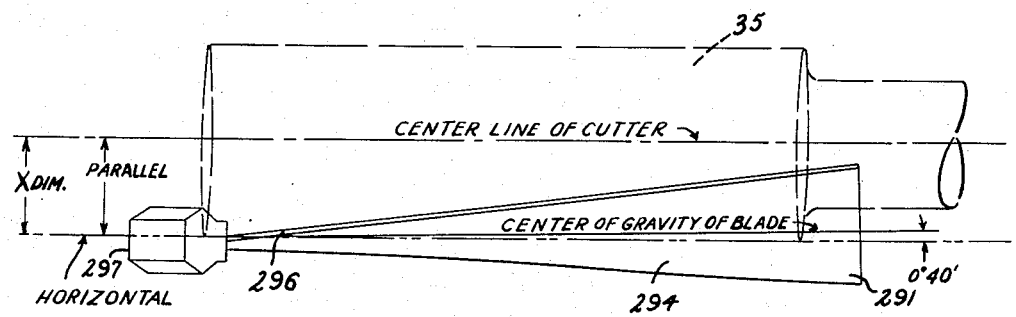
Figure 22A:
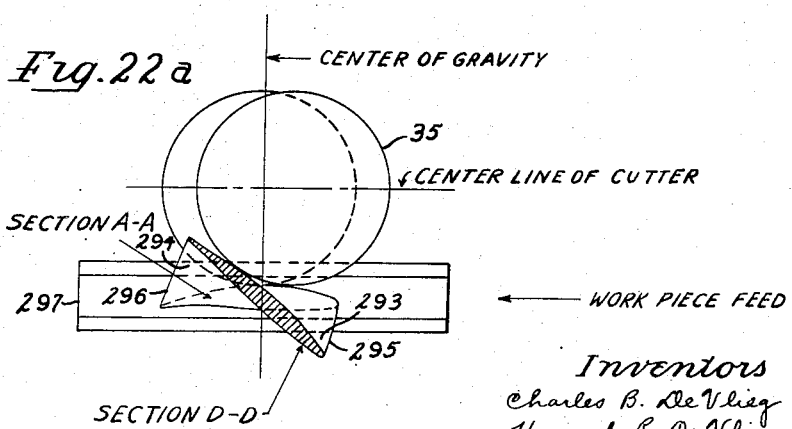

Fig. 4c, shown at the upper left-hand corner of Fig. 4, is a fragmentary diagrammatic view illustrating the direction of movement of the work piece and the direction of rotation of the spindle for machining thin sections;

Fig. 5 is an enlarged fragmentary horizontal sectional view through the work holder spindle taken along the section line V—V of Fig. 2;

Fig. 6 is a vertical sectional view taken along the section line VI—VI of Fig. 5;

Fig. 7 is a transverse sectional view taken substantially along the section line VII—VII of Fig. 2;

Fig. 8 is a longitudinal sectional view of a cutter spindle taken generally along the section line VIII—VIII of Fig. 3;

Fig. 9 is a horizontal sectional view taken substantially along the section line IX—IX of Fig. 8;

Fig. 10 is a vertical transverse sectional view taken substantially along the section line X—X of Figure 1;

Fig. 11 is a fragmentary vertical sectional view taken along the section line XI—XI of Fig. 3;

Fig. 12 is a fragmentary vertical sectional view taken along the section line XII—XII of Fig. 2;

Fig. 13 is a fragmentary vertical sectional view taken along the section line XIII—XIII of Figure 1;

Fig. 14 is a diagram of the electrical control utilized in controlling the operation of the machine;

Fig. 15 is an enlarged fragmentary top view showing the location of limit switches;

Fig. 16 is an end view of Fig. 15;

Fig. 17 is an enlarged perspective view showing a work fixture or support attached to the end of the work spindle supporting a work piece in a machining position with respect to a cutter;

Fig. 18 is a top view of an impeller blade;

Fig. 19 is an end view of the impeller blade and includes sectional views taken at points A—A, B—B, C—C, and D—D on Fig. 18;

Fig. 20 is a top view of the blade and the cutter showing the horizontal feed movement of the blade, the longitudinal movement of the cutter and the angular movement of the cutter in a horizontal plane for one position of the cams effecting the respective movements during the progression of a machining operation;

Fig. 20a is a similar view with the cams in a second position;

Fig. 20b is a similar view with the cams in a third position;

Fig. 21 is a side view showing the vertical rise and fall movement of the work piece and the rotation of the work piece about a transverse axis for one position of the cams effecting the respective movements;

Fig. 21a is a view similar to Fig. 21 showing the cams in the second position;

Fig. 21b is a similar view to Fig. 21 with the cams in the third position;

Fig. 22 is an end view of Fig. 20 at the section D—D;

Fig. 22a is a view similar to Fig. 22 showing the cams in the second position;

Fig. 22b is a similar view to Fig. 22 with the cams in the third position;

Fig. 23 is a view showing the development of cam A;

Figs. 24 and 25 are views showing the development of cam B;

Figs. 26 and 27 are views of the development of cams C and D, respectively, and

Figs. 28 and 29 are views of the development of cams E and F, respectively.

General description

Referring now to the drawings the invention is shown embodied in a metal working machine in which the respective parts have a versatility of movement that permits the machine to make any metal working operation on a work piece ranging from a straight cut ordinarily made by a simple milling machine to a metal forming operation required for an irregular and complex generated surface on an article of manufacture such as, for example, an air foil surface of an impeller blade, wherein the contour of the surface of any cross section of the blade taken in planes parallel to the transverse or longitudinal axis of the blade varies from end to end or side to side respectively. Impeller blades of this kind and of different surface contours are now used in superchargers, jet propulsion, and the like. For purposes of illustration the machine chosen for representation of the invention comprises a support in the form of a generally rectangular base 32 (see Figs. 1, 2, and 3) which houses or supports the component parts of a milling machine. On top of the base is mounted a cutter tool head 33 in which is journaled a cutter spindle 34 on a horizontal axis. The spindle 34 is shaped to receive a conventional cutter 35 or similar tool for machining or shaping the work piece. The cutter head 33 is supported on a platen or table 36 (see Fig. 3) arranged to permit angular motion of the cutter 35 in a horizontal plane about a fixed axis. The table 36 is supported in turn on a carriage 37. The latter is arranged so that the cutter 35 may be moved axially or longitudinally, in a horizontal plane, relative to the base 32 and the work piece as viewed in Figs. 3 and 4 in timed relation with the angular movement of the cutter. Provision is also made for adjusting the initial position of the cutter relative to the table 36 during a set-up operation. In the present instance the longitudinal and angular movements of the cutter are under the control of appropriate cams A, and C and D, respectively. However, as the invention becomes better understood, it will be apparent that any other suitable means may be employed in controlling these respective movements.

At the front end of the base and at one side of the cutter head (see Fig. 3) is a work head 38. The work head is supported (see Fig. 2) at the top of a rise and fall column or slide 39 which is mounted at one side of the base and arranged to effect vertical movement of the work piece relative to the cutter 35 and the base 32 in timed relation with the respect movements of the cutter. Within the work head 38 is a work holder spindle 42 disposed on a horizontal axis and fashioned to support a work fixture, such as is shown schematically at 40 in Fig. 4. The spindle 42 is arranged for movement in a horizontal direction transversely of the base 32, in timed relation with the vertical movement of the work head 38 under the control of a lead screw 43 (see Figs. 4a and 5), so as to move the work piece toward and away from the cutter 35. Provision is also made for simultaneously effecting a rotational or rocking movement of the work fixture about the spindle axis as the work piece is being fed to the cutter 35. In the present instance the vertical movement of the rise and fall column 39 and the rotational movement of the fixture are under the control of suitable cams B, and E and F, respectively. Here, as in the case of the cutter control cams, any other suitable means may be employed in controlling the respective movements of the component parts.

In accordance with my invention it is contemplated that by changing the shape of the respective cams, the various movements of the cutter and the work fixture can be coordinated in predetermined timed relation so as to effect the desired metal working operation in machining an irregular generated surface on the work piece.

Provision is made for driving the main gear trains of the milling machine either manually, primarily for initially setting up the machine for a cutting operation, or by power supplied by a motor 44. The motor preferably is a two-speed motor whereby a rapid traverse of the work piece toward the cutter is effected during the in and out movements of the work piece toward the cutting position and a slow-speed feed is effected during the actual milling operation. The motor is mounted on the rearward side of the base 32 underneath the carriage 37. As best shown in Fig. 4 the motor is connected to a main drive shaft 45, the purpose of which will presently appear, through a V-belt connection. The drive shaft extends transversely of the base 32 and is suitably journaled at both ends. To prevent accidental contact by an operator with the moving belt and also to keep dirt and the like from contact with the moving parts, the V-belt drive is enclosed in a protective guard in the form of a housing 46 secured to the base 32. Manual power is supplied to the drive shaft 45 through suitable means, such as a separate V-belt connection driven by a hand crank 50. In this instance, this connection includes a shaft 47 (see Fig. 13) which is suitably journaled in the base 32 and a removable housing 48 that forms a guard for the manually operated V-belt drive. The outer end of the shaft is squared and projects beyond the housing 48 for engagement by the removable hand crank (not shown). A small visor 49 pivotally connected at one end to the housing 48 forms a guard for protecting the squared end and also preventing accidental contact by an operator with the rotating shaft 47. The visor 49 is electrically interlocked with the control circuit for the motor 44, the arrangement being such that when the hand crank is affixed to the shaft 47 the visor 49 will be in a raised position, thereby opening the interlock contacts and thus making it impossible to rotate the main drive shaft 45 by means of the motor 44. A conventional belt tensioning device utilizing a roller 52 supported within the housing 48 provides a means for adjusting the tension in the hand driven V-belt connection.

Provision is made for operating the machine either under manual or automatic electric control as described more fully hereinafter. A cubical 53 enclosing the electric control panel 54 for operating the machine is rigidly secured to the base 32. Cooling oil for the cutter is provided by an oil pump driven by a motor 55 mounted on the base 32. For assembling and maintaining the milling machine, suitable doors and cover plates are included on the respective component parts.

Cutter mechanism

Referring more particularly to Figs. 1, 2, 3, 4, 8, 9, 10, and 13, it will be observed that the cutter spindle 34 is disposed in a horizontally extending housing 57 forming a part of the cutter spindle head 33 (see Fig. 8). The spindle 34 is supported at opposite ends by suitable radial and end thrust bearings 58 and 59, respectively. Lubricant seals in the form of annular flanges 62 and 63 are bolted respectively to the opposite ends of the housing 57, and at the forward end the seal 62 is utilized for retaining the bearings 58 in the housing. At the rearward end of the housing the bearings 59 are positioned by a collar 64 and a locknut 65 on the spindle 34. The spindle is of conventional construction and is shaped to chuck a milling cutter 35. The spindle is driven through a V-belt drive (see Figure 1) by a motor 66 which is mounted on a platform 67 on top of the cutter spindle housing 57. The platform 67 is hinged at one side (see Fig. 10) and is adjustably held in position by a screw and nut connection 68. Thus, tension in the V-belt drive can be varied to suit the particular operation by adjusting the vertical position of the motor 66. The longitudinally extending rods 69 at the top of the housing 57 are adapted for use in conjunction with a cutter tool steady rest fixture (not shown).

The spindle housing 57 is mounted on a saddle 72 (see Figs. 2 and 10) which in turn is mounted on the platen 36. The saddle 72 is adapted for transverse movement under the control of adjustable screw and nut connections 73 on opposite sides of the saddle. The spindle housing 57 is formed on its underside with longitudinally extending feet 74 arranged to slide on longitudinal ways formed on the saddle 72. A gib plate 75 secures the spindle housing in position on the saddle. Longitudinal adjustments of the spindle housing are made by an adjustment screw and nut connection 76 (see Fig. 3). The foregoing longitudinal and transverse adjustments of the saddle relative to the platen 36 are utilized primarily in initially aligning the cutter 35 with the work piece.

The platen 36 is supported by the carriage 37 (see Figs. 8, 9, and 10) and is arranged to be moved angularly in a horizontal plane about a vertical axis thereon. This axis is established by a pivot post 78 having its upper portion fitted in a circular opening 77 in the platen 36 and its lower portion journaled in a bearing 82 in a bracket 83 formed on the carriage 37. The post is bolted to the platen and is provided at its lower end with a flange 84 for engaging an annular shoulder 85 formed on the bracket 83 to retain the parts in pivoted relation. The upper surface of the forward portion of the carriage 37 is machined smooth to permit angular movement of the platen 36 about the vertical axis. The opposite end of the platen is arcuate shaped and fits in complementary arcuate ways 86 formed on the upper side of the carriage 37. A correspondingly arcuate shaped gib 87 bolted to the carriage 37 retains the platen 36 on the ways 86 during angular movement of the latter member.

Movement of the platen 36 about the vertical axis, which in turn effects angular movement of the cutter 35 about the work piece, is effected in the present instance by appropriate cams C and D, cam followers, and a gear train operatively connected to the main drive shaft 45. As best shown in Figs. 4 and 13 the power take-off from the main drive shaft 45 is effected by a worm 88, mounted on the drive shaft and driving a gear 89 supported by a vertically extending shaft 92. The latter is supported by a bracket 93 rigidly attached to the base 32 and forming a housing for the gear 89 and shaft 92. The upper end of the shaft projects through a rib 94 integral with the base 32 and carries a pinion gear 95. The pinion gear 95 drives a spur gear 96 (see Fig. 8). The latter is mounted on the lower end of a vertical shaft 97 suitably journaled by a bracket 98 in the base 32. At the upper end of the shaft 97 is a bevel gear 99 which engages a bevel gear 102 mounted at one end of a horizontally extending shaft 103. The shaft 103 is supported by a bracket 104 integral with the base 32 and is provided with suitable bearings. The opposite end of the shaft 103 is fashioned with a splined surface 105. Slidably connected to the splined end of the shaft 103 is a sleeve 106 having internal grooves shaped to interfit with the splined surface on the shaft 103. The sleeve 106 is rigidly connected to one end of a horizontally extending shaft 107 supported by a bracket 108 on the carriage 37. This sliding connection permits the carriage 37 to be moved longitudinally with respect to the base 32 and simultaneously transmits the driving force to the cams C and D which in turn control the angular movement of the platen and its associated cutter, as will be described more fully hereinafter.

At the opposite end of the shaft 107 is a pinion gear 109. The latter engages a rack 112 which is mounted on a slide 113 by bolts 114. The slide 113 (see Fig. 9) is arranged to move bodily transversely of the carriage and carries two plate cams C and D in parallel horizontal planes as shown in Fig. 8. Riding the cams C and D (see Fig. 9) and arranged to follow the surface thereof are followers in the form of rollers 115 and 116 journaled at one end of spaced elongated bars 117 and 118, respectively. On the opposite end of the bars are rack gears 119 and 122, respectively. The bars are arranged to slide or move bodily longitudinally in ways 123 and 124 (see Fig. 10) formed on the carriage 37. The rack gears 119 and 122 engage pinion gears 125 and 126, respectively. The latter gears are integrally formed on vertically extending shafts 127 and 128, suitably journaled on the carriage 37. Rollers 129 and 132 press against the sides of the bars 117 and 118, respectively, opposite the racks 119 and 122 to insure positive engagement of the racks with the pinions 125 and 126. Above the pinion gears and integral with the shafts 127 and 128 are spur gears 133 and 134. These latter are arranged to engage spaced positions on an arcuate gear segment 135 (see Fig. 9) rigidly secured to the underside of the platen 36 by suitable bolts. From the foregoing, it is seen that the angular movement of the cutter 35 about the vertical pivot axis is controlled by the contour of the cams C and D, the position of which at any instant is determined by the driving gear train.

The cams C and D and the bars 117 and 118 are so related that in effecting rotation of the gear segment 135, one of the bars moves bodily in one direction while the other bar moves bodily in the opposite direction. To adjust the position of the cam followers with respect to the cams, adjustment screws 137 and 138 (see Figs. 8 and 9) are provided. These screws are interposed between the respective end portions of the bars 117 and 118 which in this instance are formed by two end to end parts.

Means is provided for preventing backlash when the angular movement of the cutter is changed from one direction to the other. In the present instance this is effected by a spring 139 associated with the adjustment screw in the bar 118 such that it constantly urges the roller 116 into engagement with the cam D and the rack 122 into engagement with the pinion gear 126. Thus, no matter in which direction the cutter 35 is moved, positive engagement of the roller 116 with the cam D, and positive engagement of the rack 122 with the pinion 126 insures that the cutter 35 will be rotated without any lost motion. For maintenance and changing the cams the cover plate 141 at the rearward end of the carriage may be removed.

The carriage 37 is mounted to move longitudinally of the base so as to effect relative movement between the cutter and the work piece. For this purpose (see Fig. 10) a flat slide 143 and a bevel slide 144 are formed on the under side of the carriage extending longitudinally thereof from end to end and fitting in complimentary ways fashioned on the upper side of the base 32. Gibs 145 and 146 secure the carriage on the ways. Movement of the carriage is under control of the cam A which is driven through a gear train operatively connected to the drive shaft 45. To simplify the construction of the milling machine, the initial part of the gear train which drives cams C and D is utilized herein to drive cam A. Referring to Figs. 4 and 8, the power take-off from the gear train, just described, driving cams C and D, is made by a spur gear 147 mounted on the vertical shaft 97 and intermeshing with a spur gear 148. The latter meshes with a spur gear 149 which in turn meshes with a spur gear 152 secured on the lower end of a vertical shaft 153 supported by a bracket 154 forming a housing for the spur gear 152. Herein the spur gears 148 and 149 are suitably journaled on the under side of a rib 155 formed on the base 32. The vertical shaft 153 is suitably journaled and is positioned intermediate the sides of the carriage. On the upper end of the shaft 153 is mounted the cam A. A cam follower in the form of a roller 156 suitably journaled in an adjustable bracket 157 bolted to the carriage 37 engages the cam A. The contour of the cam A is such that actuation of the cam effects longitudinal movement of the carriage. Opposing the motion of the carriage as effected by the cam A, is a compression spring 158 interposed between the base and the carriage. Herein the spring is disposed within a counterbore 162 in the base 32. One end of the spring abuts against the bottom of the bore and the opposite end engages an abutment in the form of a plunger 163 arranged to telescopically slide in the bore 162. The outer end of the plunger 163, in the form of a bolt head, engages the bracket 157 on the carriage supporting the roller 156. The pressure of the spring 158 can be readily varied by an adjusting nut 164. Thus, lost motion between the parts can be eliminated by adjusting the nut 164 so as to insure positive engagement of the roller 156 with the cam A at all times. The initial axial position of the cutter relative to the work piece may be adjusted to suit the particular machining operation. For this purpose, a micrometer adjustment 165 is provided on the carriage 37 for varying the relative position of the bracket 157 and the roller 156 with respect to the carriage 37. A bolt 159 threadable through a bracket 160 secured to the base 32 and threadable into the end of the carriage, opposite cam A, is provided for holding the carriage in a forward position against the action of spring 158 during service and maintenance of cam A.

*Work head mechanism*

Referring to Figs. 1, 2, 3, 4, 5, 6, 7, 11, and 12 it will be seen that the work head 38 comprises a housing 166 enclosing the spindle 42 mounted on the top of a rise and fall column 39. Herein the spindle 42 is in the form of a circular sleeve (see Fig. 5) slidably and rotatably disposed in a horizontally extending housing 167 affixed to the housing 166 and overlying the base 32. At its outer end the spindle 42 is shaped to carry a work fixture for supporting the work piece as the latter is fed to the cutter 35. A lubricant seal 168 is provided at the outer end of the housing 167 and surrounding the spindle 42 for preventing leakage of oil from the housing 166. The rise and fall column 39 is formed with vertical slides arranged to move up and down relative to the base 32 on suitable vertical V and flat ways 169 and 172, respectively (see Fig. 3) formed on one side of the base. Gib plates 173 and 174 secure the column 39 in the sliding position.

Horizontal feed movement of the work piece in a predetermined timed relation with the cutter movements is under the control of the lead screw 43 associated with the spindle 42 and operatively connected to the drive shaft 45 by a suitable gear train. Herein the lead screw 43 is threaded into an anti-backlash nut 175 disposed in a concentric relation on the interior of the spindle 42. The nut is held against both relative axial and rotational displacement. Thus rotation of the lead screw effects axial movement of the spindle. At opposite ends of the nut suitable bearings 170 and 171 are provided for permitting rotational movement of the spindle 42 about its longitudinal axis in timed relation with the axial movement thereof as will be presently more fully described. As best shown in Figs. 4a, 5, and 7 the nut is formed in two parts 175a and 175b in axial alignment and joined together by an interlocking tongue and groove construction formed on the respective mating edges of the parts. The part 175a abuts against the bearing 170 on the interior of the spindle 42 so that the threads on the part 175a positively engage one side of the threads on the outer portion of the lead screw 43. The part 175b is arranged so that the threads formed thereon positively engage the opposite side of the threads on the inner portion of the lead screw. To this end a washer 180, dimensioned to the correct axial length, abuts against the bearing 171 which in turn abuts against the part 175b to position the latter. The washer 180 is positioned by an annular flange or cap 181 bolted to the spindle 42. The nut 175 is held against rotation by diametrically opposed pins 176 and 177. The latter extend through the housing 167 and cut away portions of the spindle 42 and slidably fit in elongated axially extending slots 178 formed on opposite sides of the nut 175. From the foregoing it will be seen that the nut is held against rotational movement and that the threads on part 175a or 175b positively engage the threads of the lead screw at all times. Thus, there will be no lost motion between the respective components of the machine when the direction of rotation of the lead screw is reversed. The lead screw 43 in the present instance is formed on the end of a horizontal transversely extending shaft 179 suitably journaled in a bracket 182 formed in the housing 166. The shaft 179 is secured in position by a shoulder 183 integral with the shaft and arranged to abut a bearing 183a and a locknut 184 threaded on the shaft and arranged to abut a bearing 184a with a radially inwardly projecting portion 182a of the bracket 182 disposed between the bearings 183a and 184a and defining shoulders limiting axial movement thereof.

As best shown in Fig. 4 the power take-off from the main drive shaft 45 for driving the lead screw 43 comprises a worm gear 185 on the outer end of the drive shaft engaging a complementary annular gear 186. The latter gear (see Fig. 11) is bolted to an annular flange 187 formed on a vertically extending sleeve 188 having internal axially extending grooves at one end. The sleeve 188 is mounted for rotation and is supported by a bracket 189 rigid with the base 32. The bracket also forms a housing for the gear 186. For servicing the latter, access to the housing is effected by removing an adapter flange 192 on the under side of the bracket 189. Forming a sliding connection with the sleeve 188 is a shaft 193 having a splined surface 194 on its lower end interfitting with the grooves in the sleeve. The shaft is supported by and journaled in a bracket 195 rigid with the rise and fall column 39. At the upper end of the shaft 193 is secured a bevel gear 197 which meshes with a bevel gear 198 attached to one end of a horizontally extending shaft 199 suitably journaled in a bracket 201. At the outer end of the shaft 199 is a pinion gear 203 meshing with a spur gear 204 meshing with a spur gear 205 (see Fig. 4) which in turn meshes with a spur gear 206 mounted on the shaft 179 integral with the lead screw 43. The respective spur gears are suitably supported and journaled in a compartment 207 (see Fig. 11) mounted at the rear of the rise and fall column. For purposes of maintenance and servicing the latter gears a cover plate 208 at the rear of the column may be removed.

Rotational motion of the spindle which in turn effects the rotational movement of the work piece in a predetermined timed relation with the horizontal feed movement thereof is under the control of suitable cams E and F, cam followers, and a gear train operatively connected to the drive shaft 45. To simplify the construction a part of the gear train used in supplying power to the lead screw 43 is utilized in supplying power to produce the rotational motion of the spindle 42. As best shown in Fig. 4 the power take-off from the shaft 179 is in the form of two sets of similar gear trains engaging opposite sides of the shaft. One such gear train comprises a pinion gear 209 on the shaft 179 meshing with a spur gear 212 which is directly connected to a pinion gear 214 which in turn meshes with a spur gear 216. This gear 216 meshes with a rack 222 formed on a slide 224 (see Fig. 2) which carries the plate cam E. The other gear train, similar to that just described, operates between the gear 209 and a rack 223 on a slide 225 which carries the plate cam F, only the first gear 213 and the last gear 217 of this gear train being shown in Fig. 4. The respective gears are suitably journaled in a compartment 218 (see Fig. 5) formed in the housing 166. The cams E and F are arranged in spaced parallel relation on slides 224 and 225 (see Fig. 2), secured on ways formed on the head 38 by gibs 226 and 227, respectively. Associated with the cams E and F are cam followers (see Fig. 4) in the form of rollers 228 and 229 supported on the upper and lower ends, respectively, of elongated bars 232 and 233 (see Figs. 5 and 6) slidably disposed in vertically extending ways 234 and 235 formed in the housing 166. At the end of each bar opposite the respective rollers are racks 236 and 237 respectively. The latter, in their movement which is controlled by the contour of plate cams E and F, mesh with elongated pinions 238 and 239 (see Fig. 6) on opposite sides of the spindle 42. Rollers 241 engageable with opposite sides of each bar, guide the latter and insure engagement of the racks 236 and 237 with each pinion gear. Suitable bearing supports are provided for each pinion gear 238 and 239. These gears are arranged to simultaneously mesh with a spur gear 242 secured to the inner end of the spindle by the annular flange 181 bolted thereto. The width of each pinion gear 238 and 239 is several times that of the spur gear 242 so as to permit continued meshing of the respective gears as the spindle 42 is moved horizontally toward and away from the cutter 35 in accordance with the particular feed requirements of the generated surface being formed on the work piece.

Means is provided for preventing backlash in the respective parts described in the foregoing paragraph upon reversal of direction of movement of the parts. To this end the bar 233 is provided with the rack 237 that is movable relative to the body of the bar. As shown in Fig. 6, a spring 244 is interposed between the bar and the rack, urging the rack to positively engage the pinion 239 and the roller 229 to positively engage the cam F at all times. Thus it is obvious that there will be no lost motion between the component parts during a reversal of movement of such parts.

Vertical movement of the rise and fall column which in turn controls the vertical position of the work piece with respect to the cutter in timed relation to the horizontal and the rotational movement of the work piece is under the control of the cam B, a cam follower, and a gear train operatively connected to the main drive shaft 45. For simplicity of construction a part of the gear train used in driving the lead screw is also utilized in effecting a vertical movement of the rise and fall column 39. The power take-off herein is made from the shaft 193 (see Figs. 4 and 11) by a pinion gear 245 secured thereto and meshing with a spur gear 246 mounted on a vertically extending shaft 247 suitably journaled in a bracket 248 formed on the rise and fall column 39. Above the latter gear, as shown in Fig. 11, is a pinion gear 249 secured to the shaft 247 and meshing with a spur gear 252 which meshes with a spur gear 253 mounted on a vertically extending shaft 254. Suitable bearings are provided for journaling the latter shaft. At the lower end of the shaft 254, the bearing 255 is disposed so as to abut against a shoulder 256 formed on a bracket 257 on the column for assuming thrust inherent in the vertical movement of the column. At the extreme lower end of the shaft 254 the latter is formed with an annular flange 258 to which is secured the crown cam B. Associated with the cam B is a cam follower in the form of a roller 259 arranged to engage the contour surface of the cam. The roller 259 is supported at the upper end of an adjustable bracket 262 bolted to the base 32. The position of the bracket 262 and roller 259 relative to the base 32 may be varied by adjusting the screw 263 on the under side of the bracket, thus providing an adjustment for determining the initial vertical position of the work piece with respect to the cutter 35. The effect of the cam B in its actuation is transmitted to the column by a roller 264 immediately above the point of contact of the roller 259 and the cam B. The roller 264 is suitably journaled in the column 39 and is arranged to engage an annular shoulder 265 formed on the upper side of the cam B. It is apparent that the contour of the cam B controls the vertical movement of the column. It is also apparent that there is no lost motion between the respective parts, since the weight of the column insures positive engagement of the roller 259 for assuming the weight of the column when the cam B is being replaced or serviced.

*Trip dog controls*

Certain operations of the milling machine are effected or controlled through the actuation of limit switches carried on moving parts of the machine. As described more fully below, the machine goes through a cycle of automatic operations started by a push button. This starts the main motor 44 which operates the cams A, B, C—D, and E—F, and the lead screw 43, thereby moving the work piece and the cutter in controlled movements, as described above. During these movements a trip dog 267 (see Figs. 15 and 16) actuates limit switch LS1 in a sequence of operations described below for starting the spindle motor 66 and the coolant motor 55. Another trip dog 268 actuates the limit switch LS3 as the work piece approaches a predetermined point to change from rapid traverse of the work piece to a feed rate. The work piece continues at this feed rate until a trip dog 269 actuates a limit switch LS2, thereby causing a reversal of the feed movement at a high rate of speed. At the end of this return movement the machine is stopped as the result of the trip dog 267 actuating the limit switch LS1. The respective dogs may be secured to any of the moving parts of the machine to effect the coordinated operations. In the present instance the trip dogs 267, 268, and 269 are secured by T bolts to the cam slide 224, the movement of which controls the rotational movement of the work piece, and which cam slide moves in timed relation with the other coordinated movements of the work piece and the cutter.

Provision is made on the milling machine for preventing breakage of the parts and damage to the machine due to overtravel of the respective parts in either direction of travel. For this purpose a trip dog 270 (see Fig. 11) is arranged to actuate a limit switch LS5 at a predetermined position corresponding to the overtravel limits of the machine. The limit switch is disposed in the main control circuit so that upon actuation thereof, the main control circuit is de-energized. This interrupts the main power circuit and disconnects the main motor 44, the coolant motor 55, and the spindle motor 66 from the power supply line, and thus effects a stoppage of all movement of the respective parts on the machine. Preferably the trip dog 270 and the limit switch LS5 are located so as to be inaccessible after the machine has been initially set up for a particular operation. Herein the limit switch LS5 is mounted on the bracket 201 formed on the rise and fall column 39, and the trip dog 270 is mounted on the upper side of the gear 253, which turns in timed relation with the several moving parts of the machine.

*Electric control*

Referring now more particularly to Fig. 14 of the drawings the electrical control equipment there illustrated, is provided for causing the milling machine to produce the movements described in the preceding paragraphs in a manual or a fully automatic manner. As shown, the three motors 44, 55, and 66 are arranged for energization from a three-phase alternating circuit source which also acts to supply current to the control panel through a voltage step-down transformer 272, a pair of fuse links 273, and a pair of current overload relays 274. The three motors are separately fused in the manner illustrated. The motor 66 for driving the cutter 35 is arranged for either clockwise or counterclockwise direction of rotation which is determined by the selective connection of its terminals to the conductors of the power circuit. The main motor 44 is provided with two electrical windings, a high speed winding and a low speed winding for controlling the rapid approach speed and the feed speed of the work piece. Provision is also made for reversing the direction of rotation of the motor 44. The coolant motor 55 is connected to the power lines through appropriate contacts and controls the supply of coolant liquid to the cutter 35.

The control equipment for producing the desired selective energization of the respective motor windings comprises: a group of relays and contactors CR1, CR2, CR3, CR4, L1, H1, HO, TR1, SF, SR, and C; limit and interlock switches LS1, LS2, LS3, LS4, and LS5 which are controlled in a manner more fully explained below in accordance with the movement of the component parts provided on the machine; and control switches 275, 276, 277, 278, 279, 282, 283, and 284. Switch 275 (a push button) is utilized to initiate the operating cycle of the machine. Switch 276 is utilized to stop the operation of all moving parts of the machine at any point in the operation. Switch 277 is for controlling the return of the work piece to its initial position at any point in the operation. Switch 278 is for determining whether the cut of the work piece will be made on the in or the out movement of the spindle; that is, it provides for reversing the main power leads to the motor 44. Switch 279 arranges the control circuit for either manual or automatic control. Switch 282 controls the direction of rotation of the cutter. Switch 283 controls the intermittent rotational movement of the spindle during manual operation. Switch 284 controls the starting and stopping of the coolant motor.

The electrical circuit may be arranged for either manual or automatic operation. For purposes of describing the operation of the control system it will be assumed that automatic operation is desired for the particular machining operation. Thus it will be assumed that the selector switch 279 is set for "automatic" operation. Likewise the selector switch 278 is set so that the cut on the work piece is made during the feed travel of the work spindle toward the cutter 35.

In order to start the machine the operator manually depresses the push button of the self-restoring start switch 275 to complete a circuit through the limit switch LS5, the limit switch LS2, the left contacts on switch 278, the left contacts on switch 276, the left contacts on switch 277, normally closed interlocks CR4a, and normally closed interlocks HO2 for energizing the winding of the relay CR1. In operating, the relay CR1 closes its normally open contacts CR1a to provide a locking circuit for itself through the right contacts of the switch 279. Thus, the relay CR1 is held operated after the button of the start switch 275 is released by the operator and an operating cycle of the machine is initiated. At its normally open contact CR1b the relay CR1 in operating closes a point in the circuit for energizing the windings of the contactors SF or SR depending on the required direction of rotation of the cutter spindle 35. This is accomplished by a circuit in which the top terminals of both relay coils SF and SR are connected to the top terminal of the secondary of line transformer 272 while the bottom terminal of relay coil SF is connected to the top terminal of the right-hand section of control switch 282 and the bottom terminal of the relay coil SR is connected to the bottom terminal of the left-hand section of control switch 282. The top terminal of the left-hand section of switch 282 and the bottom terminal of the right-hand section are connected together and to the top terminal of contact CR1b of the relay CR1. The bottom terminal of the contact CR1b is connected to the top terminal of the left-hand section of control switch 283, the bottom terminal of that switch section being connected through the right contacts of the stop switch 276, through either the right contacts of the reverse switch 278 and a limit switch LS1 or the third from right contacts of the reverse switch 288 and the limit switch LS2, and through limit switch LS5, overload relays 274 and fuse links 273 to the bottom terminal of the secondary of control transformer 272. At its normally open contacts CR1c, the relay CR1 in operating closes a circuit through normally closed interlocks CR2a to energize the winding of the contactor coil H1. This circuit includes a connection from the top terminal of contactor coil H1 to the top terminal of the secondary of transformer 272, the bottom terminal of the contactor coil H1 being connected through contact CR2a, contact CR1c, contact HO2, contact CR4a, the left-hand contacts of switches 277 and 276, contacts of the reverse switch 278, either limit switch LS1 or LS2 and overload relays 274 to the bottom terminal of the secondary of transformer 272.

At its contacts H13 the contactor H1 in operating connects the winding terminals of the main drive motor 44 to conductors L1, L2, and L3 of the power line in the correct phase relationship to produce rotation of this motor in the direction required to move the work spindle toward the cutter 35 at the rapid approach or high rate of speed. The direction of rotation of a three-phase motor may, of course, be controlled by reversing any two of the three connections through the three-phase line and, in the circuit of Figure 14, a manually operable switch 278 is provided to reverse the connections to and the direction of rotation of motor 44. As shown in Figure 14, the lower terminal of the high speed winding (right side) of motor 44 is connected through one of the contacts H-13 directly to L-1, the middle terminal is connected through another of the contacts H-13 either to L-2 through the left contact of reverse switch 278 or to L-3 through the fourth from left contact of switch 278 depending upon the position of the switch 278 and the upper terminal of the high speed winding of motor 44 is connected through another of the contacts H-13 to either L-3 through the third from left contact of switch 278 or to L-2 through the second from left contact of switch 278. Hence, switch 278 controls the direction of rotation of motor 44. At its contacts H12, the contactor in operating opens a point in an obvious circuit for energizing the contactor L1 which, as will appear, is for slow speed operation of the motor 44 and it is essential that this contactor L-1 be deenergized during high speed operation. This circuit includes a connection from the top terminal of contactor coil L-1 to the top terminal of the secondary transformer 272 and from the bottom terminal of contactor coil L-1 through contact H12, contact CR2c, contact CR1c, contact 802, contact CR4a, the left-hand contact of switches 277 and 276, contacts of the reverse switch 278, either limit switch LS1 or LS2 and overload relays 274 to the bottom terminal of the secondary of transformer 272. As the work spindle 42 moves inwardly, the dog 267 on the slide 224 to which the cam E is rigidly attached, effects actuation of the limit switch LS1 so as to close a circuit in which the latter is disposed. It is to be understood that the actuation of the limit switch could be effected by any of the various moving work head parts since all of the component parts move in a predetermined coordinated manner. Assuming that the switch 282 is set for the "forward" position thereof and that the switch 284 is set for the "on" position, actuation of the limit switch LS1 closes an obvious circuit including the left contacts on switch 283, the normally open contacts CR1b, the switch 282 to energize the contactor coil SF and the contacts on switch 284 to energize the contactor coil C. This circuit is traced in detail above.

Energizing the contactor coil SF closes normally open contacts SF1 which connects the windings of the spindle driving motor 66 to the conductors of the power circuit in the correct phase relationship to produce a desired direction of rotation of the cutter 35. The latter contactor upon operating closes a locking circuit for itself through its normally open contacts SF2, the left contacts on the switch 283, and switch 282. It is readily apparent that if the switch 282 had been set at the "reverse" position a circuit would have been closed through normally open lower contacts of the switch 282 to energize the contactor coil SR. Energizing the contactor coil SR closes the contacts SR1 which connects the windings of the spindle driving motor 66 to the line conductors to produce reverse or counterclockwise rotation of the spindle motor. A locking circuit for the contactor coil SR is closed on energization of the coil through its normally open contacts SR2 which are connected in parallel with the relay contacts CR1b. At its contact C1 the contactor C connects the winding terminals of the coolant motor 55 to the conductors of the power line in the correct phase relationship to produce the proper rotation of the coolant pump which supplies lubricant to the cutter during the milling operation.

At this stage of the automatic control all three motors 44, 55, and 66 are running and the work spindle is moving the work piece inwardly toward the cutter at the rapid approach, that is the high rate of speed. A lower rate speed is required during the actual cutting operation and for this purpose the speed of the main drive motor 44 is reduced from 1200 R. P. M. to 600 R. P. M. Herein this is effected by actuation of a limit switch LS3 which is momentarily closed by the dog 268 during the forward movement of the work spindle 42 toward the cutter. As shown in Fig. 15 the latter switch is positioned on the slide 224 supporting the cam E. As a result the relay CR2 is energized through the circuit comprising the right control circuit contacts on switch 278, the limit switch LS1, and the limit switch LS5. The normally open contacts CR2b are connected in parallel with the limit switch LS3. Thus when the relay CR2 is energized a sealing in circuit is provided through the closing of its normally open contact CR2b.

At its normally closed contacts CR2a, energization of the relay opens the circuit energizing the contactor H1. The de-energization of the contactor H1 opens the line contacts H13 and disconnects the main motor 44 from the power line, and at its contacts H12 closes a point in the circuit for energizing the contactor L1. At its normally open contact CR2c, energization of the relay CR2 closes a circuit through the normally closed contacts H12, the normally open contacts CR1c, the normally closed contacts HO2, the normally closed contacts CR4a, the return switch 277, the stop switch 276, the switch 278, the limit switch LS2, and the limit switch LS5 to energize the coils of the contactor L1.

The contactor L1 in operating connects the low speed winding of the main motor 44 to the power conductors through the line contacts L13 in the proper phase relationship in a manner similar to operation of contactor H1 and contacts H13 as above described and the windings are such that the speed of the motor 44 is reduced from 1200 R. P. M. to 600 R. P. M. with the direction of rotation of the main drive shaft remaining the same. Through the utilization of the normally closed contacts H12 on the contactor H1, operation of the contactor L1 is impossible before the contactor H1 has dropped out, since the contacts H12 form an electrical interlock preventing the energization of the coils on contactor L1.

The operation of the machine and direction of travel of the work may be reversed at any time by manual operation of the reversing switch 278. When the motor 44 is operating at a slow speed, operation of the reverse switch 278 would result in slow speed reverse operation which would usually be desirable. Moreover, it is desirable that the travel be reversed automatically at the end of the cutting operation. For these reasons, a contactor HO is provided which may be manually energized by a switch 277 at any time to secure full speed reverse operation or the contactor HO may be automatically energized at the end of the cutting operation to secure full speed reverse operation.

At the end of the inward travel of the work spindle, that is, at the completion of the machining operation, the limit switch LS2 is caused to be opened by the dog 269 provided on the slide 224 supporting the cam E. It will be seen from the drawings that opening of the limit switch LS2 will de-energize relays CR1, CR3, and contactor L1. At its normally open contacts CR1c, de-energization of the relay CR1 opens a point in the circuit for the contactor L1 which controls the low rate movement of the work piece. At its normally open contacts CR1b, de-energization of the relay causes a point to be opened in the starting circuit for the contactor SF or SR and the contactor C. Since the SF and SR contactors are provided with normally open contacts SF2 and SR2, respectively, that close circuits for sealing in the contactors and the contactor C after initial energization through the normally open contacts CR1b, it will be apparent that the opening of the contacts CR1b will have no effect upon the operation of the spindle or coolant motors at this time. Upon de-energization of CR3 its normally closed contacts CR3a closes a circuit through the left contacts on switch 279 and the normally closed contacts CR4b to energize the contactor HO and the timing relay TR1 connected in parallel with the contactor HO. The contactor L1 upon being de-energized opens its line contacts L13 to disconnect the main drive motor 44 from the line terminals L1, L2, and L3, respectively.

The timing relay TR1 is a slow-to-release contactor, being provided with a valve control dash pot having the function of delaying opening of the contacts TR1b after its winding is de-energized. In operating the timer opens its normally closed contacts TR1a and closes the contacts TR1b, all without effect at the present time. At its normally open contacts, TR1c, the timing relay TR1, in operating, closes a locking circuit for itself and the contactor HO through normally closed contacts CR4b, the left contacts on the switch 279, the lower contacts on the switch 276, the right contacts on the switch 278, and the limit switches LS1 and LS5.

Actuation of the contactor HO effects a connection of the terminals of the winding of the motor 44 to the line conductors through its contacts HO1 for proper speed and phase relationship for obtaining reverse direction of rotation of the motor 44 at high speed, whereby the work piece is moved at the rapid rate in a direction away from the cutter 35. At its normally closed contacts HO2, the contactor HO in operating opens a circuit previously described for energizing the relay CR1 and the contactor L1. Thus, it will be seen that the line contactor L1 and the contactor HO are electrically interlocked so that simultaneous operation of the respective contactors is impossible.

During the rapid return movement of the work piece the spindle is returned to its initial position. As the spindle starts in its return movement the dog 269 effects a closing of limit switch LS2 which closes a point in the circuits previously described for energizing the relays CR1, CR3, and the contactor L1. When the work spindle reaches the end of its travel, engagement of the dog 267 with the limit switch LS1 opens the latter. The opening of this switch interrupts previously described circuits for energizing relays and contactors SF or SR, C, TR1, and HO.

Upon de-energization, the contactor SF opens its contacts SF1 which disconnects the motor 66 from the main power line. At its contacts SF2, the contactor upon being de-energized effects an interruption of the locking circuit for itself and the contactor C. Upon de-energization of the contactor C, the latter opens its contacts C1 which disconnects the coolant motor 66 from the main power line. At its contacts TR1c the timing relay upon de-energization interrupts a point in the previously described sealing in circuit for the contactor HO and its own coil. The contactor HO upon de-energization of its coils, disconnects the motor 44 from the power lines at its contacts HO1. At its contacts TR1b, which are slow to open on deenergization thereof as described above, maintains a closed position point in a circuit through normally closed contacts TR1a (quickly closed on deenergization) for energizing the contactor H1. The contactor H1 upon energization closes its contacts H13 to connect the windings of the driving motor to the line conductors for the high rate clockwise direction of rotation. A considerable amount of kinetic energy will be stored in the moving parts of the machine, and there will be a tendency to overshoot the initial starting position of the work spindle. Thus, to counteract this overtravel of the various parts, the foregoing provision for plugging the motor to a stop is provided in the control circuit. Any desired adjustment may be made with the above mentioned dash pot on the relay TR1 so that the time required to stop the motor can be adjusted to suit the needs of the particular machine. As soon as the timing feature of the TR1 relay operates, the contacts TR1b open the circuit for energizing contacts H1. The contactor H1 upon de-energization disconnects the motor 44 from the line conductors L1, L2, and L3, thereby stopping the machine. The machine is then ready for another cycle of operation as soon as the milled work piece has been replaced by a suitable blank work piece.

As pointed out above the return switch 277 is provided for controlling the machine in such a manner that it is possible to return the work piece to its starting position at any time after an operating cycle of the machine has been initiated. Thus, assume that a cutting operation is in progress and that the contactors L1, or H1 and SF, and C and their respective motors 44, 55, and 66 are energized. Under these circumstances the limit switch LS2 may or may not be operated depending upon how far the cutting operation has progressed. Regardless of this, however, actuation of the return switch 277 results in de-energization of the contactor L1 or H1 since a circuit for energizing the latter is opened at the left contacts of the return switch 277. De-energization of this circuit causes the contactor L1 or H1 to open its contacts L13 or H13, respectively, which disconnects the main motor 44 from the power line. If the limit switch LS2 has not been actuated, a circuit may still be closed through right contacts on the return switch 277, and the limit switch LS1 which is closed at this point, which energizes the contactor HO. If the limit switch LS2 has been actuated, the operation of the machine will be as described in the preceding paragraphs relating to the automatic operation of the control circuit, contactor HO being energized on deenergization of CR3 as described above. Upon actuation, the contactor HO closes its contacts HO1 which reverses the direction of rotation of the main motor and returns the work spindle to its normal position. As the work spindle 42 approaches its initial position, the limit switch LS1 is engaged by dog 267 and opens the circuits for energizing the respective contactors SF and C to disconnect the spindle motor 66 and the coolant motor 55 from the power line, as previously described.

As will be evident from the preceding explanation the stop switch 276 is provided for the purpose of arresting operation of the machine at any point in an operating cycle thereof. Thus, when this switch 276 is manually operated a common point is opened in the operating circuits for all of the contactors referred to above, causing any operating ones thereof to be released with the result that all of the three motors are de-energized.

When it is desired to manually control the operation of the machine it is only necessary to turn the switch 279 to the "hand" position. With this setting of the switch 279 all of the operations of the machine are under hand control. The control panel also includes a switch 283 whereby intermittent operation of the spindle motor is obtainable.

The CR4 relay is operated by an interlock on the visor 49 which guards the shaft extension to which the hand crank 50 is affixed when manual motive power is supplied to the milling machine. When the visor is in a raised position so that a hand crank can be applied to the shaft 47 the relay CR4 is energized. This latter relay is provided with two normally closed contacts CR4a and CR4b, one of which is in the circuit for energizing the L1 and H1 contactors, and the other of which is in the circuit for energizing the HO contactor. It will thus be seen that when the visor is in a raised position, the relay CR4 will be energized and normally closed contacts CR4a and CR4b will be open so that the circuits to the respective contactors will be open, thereby making it impossible to connect electric power to the motor 44, thus making it impossible to operate the machine by motive power.

Method of machining an impeller blade

As prefaced above, our invention contemplates a novel method of fashioning surfaces of predetermined contour, and particularly surfaces of the air foil type. A milling machine of the above described character is representative of a metal working machine that may be utilized for this purpose. In illustrating the method phase of our invention we have provided a milling machine designed to machine the surfaces of an impeller blade 291 of the character shown in Figs. 18, 19, 20, 21 and 22. The curvature of the surface which is predetermined by calculation and test experience, is of a configuration that assures a high degree of adiabatic efficiency. As best shown in Figs. 18 and 19 the blade comprises a body portion having a top surface 293 and a bottom surface 294. For purposes of discussion, the description of the method will be directed to machining the top surface 293. As shown in the sectional views in Fig. 19 the contour of the top surface 293 along any transverse cross-section is cambered, blending smoothly with a rounded leading edge 295 and feathering at a trailing edge 296. A root portion 297 is formed integral with the body and is shaped for attaching the impeller blade 291 to the hub (not shown) of an impeller wheel. In the present instance the root portion 297 is hexagonally shaped in cross-section and is arranged to form a part of a dove-tail joint with the impeller hub. The root is inclined at an acute angle with respect to the longitudinal center of gravity line such that the leading edge 295 extending from the root portion 297 to a tip 298 is longer than the trailing edge 296 extending from the root portion to the tip. The blade 291 is twisted or warped from the root portion to the tip about the center of gravity. This is best shown in Fig. 19, wherein it will be seen that if a line is drawn tangent to the curves on the bottom surface 294 of the blade, and then a line is drawn parallel to this tangent line through the center of gravity, the angle theta ($\theta$), measured between the horizontal center line of the root and the line through the center of gravity, varies for any transverse cross-section view from the root 297 to the tip 298.

Normally, blades of this character are first formed by a drop forge or similar process. Due, however, to the high degree of efficiency that is desirable in jet propulsion impellers of this character it has been found that the top surface 293 of a blade formed in this manner is not satisfactory for the intended purpose. Accordingly, one aspect of our invention is concerned with the fashioning of a surface on the impeller blade that will adequately perform its desired function. Thus, our invention contemplates a method for forming an integrated smoothly finished surface, in which the contour of any cross-section taken either transversely or longitudinally from side to side or end to end varies, by coordinating the movements of the blank work piece and a metal working tool in a manner hereinafter to be described.

The work piece is supported by a fixture or support 299 (see Fig. 17) that is moved in a predetermined manner into engagement with the cutter 35. The fixture 299 has an upright portion 302 arranged for securing the fixture to the spindle 42 and an outwardly extending arm or bracket 303. The latter is formed with transversely extending ways in which slides a work rest 304. The work rest is formed on its upper side with a surface complementary to the bottom surface 294 of the blade 291 to be placed therein such that when the blank is placed on the rest 304, it will be supported throughout its entire length. The rest 304 is secured in position on the ways by a gib 305. At one end a clamp 306 having jaws shaped to receive the root portion of the blade 291 holds the latter end of the blade securely on the rest. An adjustable clamp 307 is also provided for securing the tip end 298 of the blade to the rest. Each of these clamps has an adjustment screw for clamping it in the holding position.

The metal working tool, in the present instance, is in the form of a straight, spiral milling cutter 35. It is to be understood, however, that a tapered milling cutter may be utilized if desired. Also where desired, a polishing tool, grinder, or the like may be utilized.

The generated surface 293 is formed on the work piece through the coordinated movements of the work piece and the cutter 35 as controlled in the milling machine in a predetermined manner. In forming a surface 293 the work piece is initially brought into a position with respect to the cutter such that the milling operation commences with the trailing edge 296 of the blade. Thereafter, during the milling operation the cams and the lead screw are so coordinated that simultaneously the work piece is moved in the direction of a transverse axis toward the cutter under the control of the lead screw 43, the work piece is rotated about the transverse axis in timed relation with the movement of the work piece along the axis under the control of the cam E—F, the work piece is moved vertically relative to the cutter in timed relation with the movement of the work piece in the direction of the transverse axis and the rotative movement about the axis under the control of the cam B, the cutter is moved in the direction of its longitudinal axis relative to the work piece in timed relation with the respective movements of the work piece under the control of the cam A, and the cutter is moved angularly about the work piece in a horizontal plane in timed relation with the respective movements of the work piece and the relative movement of the cutter under the control of the cams C—D. These movements, determined by the contour of the respective cams, continue until the surface 293 has been completely machined. At the end of the machining operation, a reversal of the moving parts of the machine without lost motion is effected and the cutter spindle and the work fixture are returned to their initial positions. The finished blade is then removed from the fixture and another blank work piece is clamped in position thereon so that the milling operation can be repeated.

For purposes of better understanding the several coordinated movements of the work piece and the cutter during the machining operation in forming the surface 293, the relative positions of the cutter 35 and the work piece are shown in Figs. 20–22b, for three positions of the respective cams during the progression of the machining operation.

In Fig. 20, the relation of the cutter and the work piece is that determined with the followers at the number 10 position on the respective cams, as shown in the cam development layouts (see Figs. 23–29). It will be noted that the cutter has not yet engaged the trailing edge 296 of the work piece. With the cutter and the work piece in this relation the center line of the cutter 35 is at an angle of 1°17′ with respect to the vertical center line of the machine, and the center of gravity line of the blade 291 is parallel with the vertical center line of the machine. In the side view (see Fig. 21) the center of gravity line of the blade is inclined at an angle of 6°26′ with respect to the horizontal center line of the machine and the center line of the cutter is parallel with the horizontal center line of the machine. The X dimension indicates the rise and fall of the blade 291 with respect to the cutter 35 and varies throughout the milling operation.

The term "vertical center line" as used herein means a line as viewed in a plan view which is through the vertical axis of angular movement of the cutter and transverse to the axis of the work support spindle 42. In other words, the vertical center line is actually a vertical plane and is only a line in such a plan view. The term "horizontal center line" as used herein means a line in a horizontal plane through the axis of the work support spindle 42 as viewed in an elevational view. In other words, the horizontal center line is actually a horizontal plane and is only a line in an elevational view. It is, of course, necessary to have a definite starting point and definite coordinate axes in order to design the machine and obtain desired relative movements of the cutter and the work.

Fig. 20a, 21a, and 22a show the blade and the cutter in a different relative position. In this view the milling cut is being made substantially midway between the leading edge 295 and trailing edge 296, and the followers are at the number 49 position on the respective cams. In comparing these views with the preceding views it will be observed that the cutter has moved longitudinally of the blade and is effecting a cut on the root portion of the surface 293. The center line of the cutter is at an angle of 3°37' in a horizontal plane with respect to the vertical center line of the machine, thus showing that there has been angular movement of the cutter from the position as shown in Fig. 20. The center of gravity line of the blade 291 coincides with the vertical center line of the machine showing that the blade has been moved bodily horizontally from the position shown in Fig. 20. In the side view Fig. 21a the center of gravity line of the blade is inclined at an angle of 0.40', with respect to the horizontal center line of the machine in a direction opposite to that shown in Fig. 21, thereby showing the blade has been rotated during the movement of the blade from the latter position.

Figs. 20b, 21b, and 22b show the blade 291 and the cutter 35 in still a different relative position. In this illustration the machining cut is being made adjacent the leading edge 295 of the blade and the followers are at the number 95 position on the respective cams. In comparing these views with the preceding views it will be seen that the cutter has moved longitudinally relative to the blade for cutting the root portion of the surface 293 adjacent the leading edge of the blade 295. The center line of the cutter is at an angle of 1°10' with respect to the vertical center line of the machine, thus showing that there has been angular movement of the cutter from the position shown in Fig. 20a. The center of gravity line of the blade 291 is parallel with the vertical center line of the machine thus showing movement of the blade in a horizontal direction from the position shown in Fig. 20a. In the side view Fig. 21b, the center of gravity line of the blade is inclined at an angle of 5°48' with respect to the horizontal center line of the machine in the same direction as that shown in Fig. 21a. From this, it will be seen that the blade has been rotated during the movement of the blade from its preceding position.

The machining process described herein began at the trailing edge of the blade with the work piece being moved toward the cutter. If desired the milling cut can be made as the work piece is being moved away from the cutter. During the forming of surfaces on articles of this character such as impeller blades having a thin cross-section, it is important that the direction of rotation of the cutter and the feed of the work piece be such that the forces set up between the cutter and the work piece during the machining operation tend to hold the blank blade in its nest on the work fixture. Thus the relation of the cutter with respect to the work piece and the rotation of the spindle for the operation shown in Figs. 20–22b is such as to effect "climb milling" of the blank. This climb milling is diagrammatically illustrated in Figure 4c. The machining operation described herein utilized all of the respective movements of the metal working machine described in the preceding paragraphs. It is obvious that in machining some surfaces it may not be necessary to utilize all of the available movements of the machine. In such instances, it is contemplated by this invention that the respective cams shall be shaped accordingly, thus insuring that only the desired movements of the machine are obtained during the particular machining process.

*Cam development*

Referring now particularly to Figs. 23, 24, 25, 26, 27, 28, and 29, it will be seen there that we have shown diagrammatically by way of illustration only, a development of the cams which function in timed relation in the milling machine to effect the foregoing movements of the cutter and the work piece in a predetermined coordinated relation so as to machine the generated surface on the impeller blade 293. Each figure shows the design of a separate cam. Fig. 23 is a development of the disk cam A for controlling the longitudinal movement of the carriage and the cutter with respect to the work piece. Figs. 24 and 25 show the development of the crown cam B employed in controlling the vertical movement of the rise and fall column and the work piece relative to the longitudinal axis of the cutter. Figs. 26 and 27 show the development of the blade cams C and D utilized in controlling the angular movement of the cutter in a horizontal plane relative to the work piece. Figs. 28 and 29 show the development of the blade cams E and F utilized in controlling the rotational movement of the spindle and the work piece about an axis. In these development layouts it will be noted that all of the respective cams are marked off for 110 degrees. Thus, the cams all operate on a 1 to 1 movement.

Cam A moves the cutter 35 relative to the work piece to cut the surface of the blade 291 adjacent the root 297. This movement is determined by measuring the distances between a line drawn perpendicular to the center of gravity line of the blade, through a point on the root adjacent to the trailing edge and a line parallel to the face of the root through the same point. The distances between these lines determine the contour of the cam A.

Cam B controls the up and down movement of the work piece during a cutting operation. This latter movement is shown in Figs. 21, 21a, and 21b. These figures show the center line of the cutter at various heights from the horizontal center line of the machine which in this case is used as a starting point for calculations of the cam. These heights are designated as the X dimension. These X dimensions are calculated from the center line of the root of the blade to the surface of the air foil at section A—A and are then converted to rise and fall motions on the cam B.

Cams C and D control the angular movement of the cutter 35 shown in Figs. 20, 20a, and 20b.

These figures show the center line of the cutter at angles to the center of gravity line of the blade and the vertical center line of the machine. These angles are determined by layout and calculations by laying straight lines from points on section A—A to points on section D—D passing through points on sections B—B and C—C to produce the desired contour of the blade. These straight lines are not necessarily parallel to each other or the center of gravity line of the blade or the vertical center line of the machine, thereby requiring varied angles of the cutter as the work is moved through the cycle. These angles are converted into rise and fall motions on the cams C and D.

Cams E and F control the rotational motions of the work piece as shown in Figs. 21, 21a, and 21b. These side views show the center of gravity line of the blade at angles to the horizontal center line of the machine. These angles are determined by layout and calculations by laying straight lines from points on section A—A to points on section D—D passing through points on sections B—B and C—C to produce the desired contour of the blade. These straight lines are not necessarily parallel to each other or to the vertical center line of the machine thereby requiring varied angles of the blade as the work is moved through the cycle. These angles are converted into rise and fall motions on the cams E and F.

It is believed that the foregoing description conveys a sufficiently clear understanding of the invention that anyone skilled in the art will readily appreciate the advantages which it derives. It is, therefore, pointed out that while a specific embodiment of a milling machine and a method for machining an irregular generated surface has been illustrated and described for the purposes of a full disclosure, it should be understood that the invention is capable of other adaptations and modifications, all of which it is the intention to include within the scope of the appended claims.

We claim:

1. In a machine for forming generated surfaces: a base; a drive shaft mounted on said base; a motor for driving said shaft; a cutter head arranged to support a cutter and mounted on the base for angular and lengthwise movement thereof; a work head mounted on said base for vertical movement relative thereto and to said cutter; a work spindle mounted on said work head and arranged for horizontal movement transversely of said base; a work fixture carried by said spindle for rotative movement about a horizontal axis parallel with the movement of the work spindle and arranged to support a work piece; means including a lead screw and a gear train interposed between said lead screw and said drive shaft for effecting movement of the spindle whereby to move the work piece horizontally into and out of engagement with the cutter; means including a cam on said base, a cam follower associated with said work head and engaging said cam, and a gear train operatively connected between said cam and said drive shaft for actuating the cam so as to effect movement of the head whereby to raise and lower the work piece with respect to the cutter in timed relation with the horizontal movement of the work spindle; means including a second cam mounted on said work head, a second cam follower mounted on said work head and engaging the second cam, and a gear train operatively connected between said second cam and said drive shaft for actuating the latter cam so as to effect rotational movement of the spindle whereby to impart a rotative movement to the work piece about an axis in timed relation with the raising and lowering movement of the work head and the horizontal movement of the work spindle; means including a third cam mounted on said base, a third cam follower associated with said cutter head and disposed to engage said third cam, and a gear train operatively connected between said third cam and said drive shaft for actuating the latter cam whereby to effect movement of the cutter relative to the work piece in timed relation with the horizontal and rotational movements of the spindle and the vertical movement of the work head; and means including a fourth cam associated with said cutter head, a fourth cam follower associated with said cutter head and engaging said fourth cam, and a gear train operatively connected between said fourth cam and said drive shaft for actuating said latter cam whereby to effect angular movement of the cutter in a horizontal plane about the work piece in timed relation with the horizontal and rotational movements of the spindle, the raising and lowering movement of the work head, and the longitudinal movement of the cutter whereby to form an irregular generated surface on the work piece.

2. A machine for forming generated surfaces, having in combination, a base; a cutter head mounted on the base for movement lengthwise thereof; a work head mounted on said base for vertical movement relative thereto and said cutter head; a work spindle mounted on said work head and arranged for horizontal movement transversely of said base; a work fixture arranged to be carried by said spindle for rotative movement about a horizontal axis parallel with the movement of the work spindle and arranged to support a work piece; a cutter spindle mounted on said cutter head and arranged to carry a cutter tool for machining the work piece; means operatively associated with said spindle for moving the work piece horizontally into and out of engagement with the cutter; means including a cam, a follower for said cam, and a gear train operatively associated with the head for moving the work piece bodily vertically relative to the cutter in timed relation with the movement of the spindle; means including a second cam, a follower for said second cam, and a gear train having anti-backlash means operatively associated with said spindle for positively rotating the work piece about said horizontal axis in timed relation with the vertical movement of the head and the horizontal movement of the spindle; means including a third cam, a follower for said third cam, and resilient means for urging said follower into engagement with said cam, operatively associated with the cutter for positively moving the latter relative to the work piece in timed relation with the horizontal and rotational movements of the spindle and the vertical movement of the work head; and means including a fourth cam, a follower for said fourth cam, and a gear train having anti-backlash means, operatively associated with the cutter for positively effecting angular movement thereof in a horizontal plane about the work piece in timed relation with the horizontal and rotational movements of the spindle, the vertical movement of the head, and the longitudinal movement of the cutter whereby to form an irregular generated surface on the work piece.

3. In a machine for forming a generated surface: a base; a work head mounted on said base for vertical movement relative thereto; a work spindle mounted on said work head and arranged for horizontal movement transversely of said base; a work fixture arranged to be carried by said spindle for rotative movement about a horizontal axis parallel with the movement of the work spindle and arranged to support a work piece; a cutter head mounted on the base for movement lengthwise thereof; a cutter spindle mounted on said cutter head and arranged to carry a cutter tool for machining the work piece; lead screw means operatively associated with said spindle for moving the work piece horizontally into and out of engagement with the cutter; means including a cam, a follower engaging said cam, and a gear train for actuating said cam, operatively associated with the head for moving the work piece bodily vertically in timed relation with the movement of the spindle; means including a second cam, a second cam follower engaging said second cam, and a gear train for actuating said cam, operatively associated with said spindle for rotating the work piece about an axis in timed relation with the vertical movement of the head and the horizontal movement of the spindle; means including a third cam, a third cam follower engaging said third cam, and a gear train for actuating said third cam, operatively associated with the cutter for moving the latter relative to the work piece in timed relation with the horizontal and rotational movements of the spindle and the vertical movement of the work head; and means including a fourth cam, a fourth cam follower engaging said fourth cam, and a gear train for actuating said fourth cam, operatively associated with the cutter for effecting angular movement of the cutter in a horizontal plane about a fixed point in timed relation with the horizontal and rotational movements of the spindle, the vertical movement of the head, and the longitudinal movement of the cutter whereby to machine an irregular generated surface on the work piece.

4. A milling machine comprising a support table, a primary motor mounted thereon, a workpiece carriage mounted on said support table for linear vertical movement, means for vertically shifting said workpiece carriage, a gear train extending into said workpiece carriage and connecting said last mentioned means to said primary motor, said gear train including a vertically slidable gear connection accommodating vertical movement of said workpiece carriage with respect to said support table, a workpiece spindle journalled in said workpiece carriage, means for rotating said workpiece spindle in timed relation to said vertical movements including a connection to said gear train, a cutter carriage mounted for linear horizontal movement on said support table, means for shifting said cutter carriage in timed relation to said movements of said workpiece spindle including a second gear train connected to said primary motor, a cutter head pivotally movable on said cutter carriage, means for pivoting said cutter head in timed relation to said movements of said workpiece spindle including a horizontally sliding gear connection to said second gear train arranged to accommodate the horizontal movements of said cutter carriage relative to said support table, a cutter spindle rotatably journalled in said cutter head, and means for rotating said cutter spindle at a milling speed.

5. A milling machine comprising a support table, a primary motor mounted thereon, a workpiece carriage mounted on said support table for linear vertical movements, means for vertically shifting said workpiece carriage, a gear train connecting said last mentioned means to said primary motor, a workpiece spindle journalled in said carriage, means for rotating said workpiece spindle in timed relation to said vertical movements including a connection to said gear train, a cutter carriage mounted for linear horizontal movements on said support table, means for shifting said cutter carriage in timed relation to said movements of said workpiece spindle including a second gear train connected to said primary motor, a cutter head pivotally movable in said cutter carriage, means for pivoting said cutter head in timed relation to said movements of said workpiece spindle, a cutter spindle rotatably journalled in said cutter head, and means for rotating said cutter spindle at a milling speed, said primary motor being selectively controllable to operate at three distinct speeds, respectively a high and slow speed in one direction, and a high speed in the opposite direction, and control means for operating said primary motor through a cycle comprising high speed operation in said one direction to move the cutter and workpiece into proximity, slow speed operation in the same direction to feed the cutter past the workpiece in a milling operation, and a high speed reverse rotation to return the cutter and workpiece to original position.

6. A milling machine comprising a support table, a primary motor mounted thereon, a workpiece carriage mounted on said support table for linear vertical movements, cam means for vertically shifting said workpiece carriage, a gear train extending into said workpiece carriage and connecting said cam means to said primary motor, said gear train including a vertically slidable gear connection accommodating vertical movement of said workpiece carriage with respect to said support table, a workpiece spindle journalled in said carriage, means for rotating said workpiece spindle in timed relation to said vertical movement including a connection to said gear train, means including a lead screw for axially shifting said workpiece spindle relative to said workpiece carriage in timed relation to said rotative movement of said workpiece spindle, a cutter carriage mounted for linear horizontal movement on said support table, means for shifting said cutter carriage in timed relation to said movements of said workpiece spindle including a second gear train connected to said primary motor, a cutter head pivotally movable on said cutter carriage, means for pivoting said cutter head in timed relation to said movements of said workpiece spindle including a horizontally sliding gear connection to said second gear train arranged to accommodate the horizontal movements of said cutter carriage, a cutter spindle rotatably journalled in said cutter head, and means for rotating said cutter spindle at a milling speed.

7. In a metal working machine, a cutter head, a cutter-carrying spindle rotatably carried by said head, a work fixture, and means connecting said cutter head and said work fixture including means for simultaneously effecting relative rectilinear movement in three transversely related directions and relative rotative movement about axes parallel to two of said directions with each of said movements being according to a predetermined function of every other movement.

8. In a metal working machine, first and second means connected for relative rectilinear movement in a first direction, third means connected to said second means for relative rectilinear movement in a second direction transversely related to said first direction, fourth means connected to said third means for relative rectilinear movement in a third direction transversely related to said second and third directions, a work fixture connected to said first means for movement about an axis parallel to one of said directions, a cutter head connected to said fourth means for movement about an axis parallel to another of said directions, a cutter spindle rotatably carried by said cutter head, and means for simultaneously effecting all of said movements with each movement being according to a predetermined function of every other movement.

9. In a metal working machine, a base, a work head mounted on said base for vertical movement relative thereto, a work spindle mounted on said work head for horizontal movement relative to said base, a work fixture carried by said spindle for rotative movement about a horizontal axis parallel with the movement of the work spindle in supporting a work piece, a cutter head mounted on said base for horizontal movement transverse to said horizontal movement of said work spindle and for movement about a vertical axis, a cutter spindle mounted on said cutter head and carrying a cutter tool for machining the workpiece, and means for simultaneously effecting all of said movements with each movement being a predetermined function of every other movement.

10. In a metal working machine, a base, a work head mounted on said base for rectilinear movement relative thereto in a first direction, a work spindle mounted on said work head for rectilinear movement relative to said base in a second direction transversely related to said first direction, a work fixture carried by said spindle for rotative movement about an axis parallel to said second direction and supporting a workpiece, a cutter head mounted on said base for rectilinear movement in a third direction transverse to said first and second directions and for movement about an axis parallel to said first direction, a cutter spindle rotatably mounted on said cutter head and carrying a cutter tool for machining the workpiece, and means for effecting all of said movements with each movement being according to a predetermined function of every other movement.

11. In a metal working machine, a cutter spindle carrying a cutter, a cutter head rotatably supporting said cutter spindle, a first support carrying said cutter head for movement about a first axis, a second support connected to said first support for relative rectilinear movement in a first direction, a third support connected to said second support for relative rectilinear movement in a second direction transverse to said first direction, a work-supporting fixture carried by said third support for relative rectilinear movement in a third direction transverse to said first and second directions and for rotative movement about a second axis transverse to said first axis, and means for simultaneously effecting all of said movements with each movement being according to a predetermined function of every other movement.

12. In a metal working machine, a cutter spindle carrying a cutter, a cutter head rotatably supporting said cutter spindle, a first support carrying said cutter head for movement about a first axis, a second support connected to said first support for relative rectilinear movement in a first direction, a third support connected to said second support for relative rectilinear movement in a second direction transverse to said first direction, a work-supporting fixture carried by said third support for relative rectilinear movement in a third direction transverse to said first and second directions and for rotative movement about a second axis transverse to said first axis, a first pair of coaxial spline-connected drive means between said first and second supports and rotatable about an axis parallel to said first direction, a second pair of coaxial spline-connected drive means between said second and third supports and rotatable about an axis parallel to said second direction, a third pair of coaxial spline-connected drive means between said third support and said fixture and rotatable about an axis parallel to said third direction, means on said second support drivingly connecting said first and second drive means, means on said third support drivingly connecting said second and third drive means, first cam means connected to said first drive means for rotating said cutter head about said first axis, second cam means connected to said first drive means for effecting relative movement of said first and second supports in said first direction, third cam means connected to said second drive means for effecting relative movement of said second and third supports in said direction, fourth cam means connected to said third drive means for effecting relative movement of said third support and said fixture in said third direction, and fifth cam means connected to said third drive means for effecting rotation of said fixture about said second axis.

13. In a metal working machine, a base, a work head mounted on said base for vertical movement relative thereto, a work spindle mounted on said work head for horizontal movement relative to said base, a work fixture carried by said spindle for rotative movement about a horizontal axis parallel with the movement of the work spindle and supporting a workpiece, a cutter head mounted on said base for horizontal movement transverse to said horizontal movement of said work spindle and for movement about a vertical axis, a cutter spindle mounted on said cutter head and carrying a cutter tool for machining the workpiece, drive means, means connected to said drive means for effecting horizontal movement of said cutter, cam means driven by said drive means and arranged for effecting movement of said work head vertically as a predetermined function of the horizontal movement of the cutter, second cam means driven by said drive means for effecting said horizontal movement of said cutter head as a predetermined function of the horizontal movement of the cutter, third cam means driven by said drive means for effecting movement of said work fixture about said horizontal axis as a predetermined function of the horizontal movement of the cutter, and fourth cam means driven by said drive means and arranged for effecting movement of said cutter head about said vertical axis as a predetermined function of the horizontal movement of the cutter.

CHARLES B. DE VLIEG.
        HOWARD R. DE VLIEG.
        CHARLES R. DE VLIEG.

References Cited in the file of this patent

UNITED STATES PATENTS

| Number | Name | Date |
|---|---|---|
| 1,376,155 | Muller | Apr. 26, 1921 |
| 1,876,353 | Sidgraves | Sept. 6, 1932 |
| 2,065,102 | Simmons | Dec. 22, 1936 |
| 2,086,915 | Kopp | July 13, 1937 |
| 2,151,078 | Bouvier | Mar. 21, 1939 |
| 2,206,942 | Cook | July 9, 1940 |
| 2,250,241 | Thalmann | July 22, 1941 |
| 2,318,865 | Johnson | May 11, 1943 |
| 2,333,121 | Pfeiffer | Nov. 2, 1943 |
| 2,373,944 | Brown | Apr. 17, 1945 |
| 2,386,146 | Shaeffer | Oct. 2, 1945 |
| 2,422,112 | Marsilius | June 10, 1947 |
| 2,450,096 | Siekmann | Sept. 28, 1948 |
| 2,508,587 | Turchan | May 23, 1950 |
| 2,524,091 | Von Zimmermann | Oct. 3, 1950 |

FOREIGN PATENTS

| Number | Country | Date |
|---|---|---|
| 85,255 | Switzerland | Oct. 1, 1920 |
| 571,551 | Germany | Mar. 7, 1933 |